(12) United States Patent
Goodman

(10) Patent No.: US 10,510,481 B2
(45) Date of Patent: Dec. 17, 2019

(54) TRANSFORMER SYSTEM WITH DYNAMIC CONTROL

(71) Applicant: John M. Goodman, Garden Grove, CA (US)

(72) Inventor: John M. Goodman, Garden Grove, CA (US)

( * ) Notice: Subject to any disclaimer, the term of this patent is extended or adjusted under 35 U.S.C. 154(b) by 0 days.

(21) Appl. No.: 16/125,595

(22) Filed: Sep. 7, 2018

(65) Prior Publication Data

US 2019/0088410 A1 Mar. 21, 2019

Related U.S. Application Data

(60) Provisional application No. 62/561,397, filed on Sep. 21, 2017.

(51) Int. Cl.
*H01F 29/02* (2006.01)
*H02M 5/12* (2006.01)
*H01F 27/29* (2006.01)
*H01F 27/28* (2006.01)
*H01F 27/24* (2006.01)

(52) U.S. Cl.
CPC .......... *H01F 29/025* (2013.01); *H01F 27/24* (2013.01); *H01F 27/28* (2013.01); *H01F 27/29* (2013.01); *H02M 5/12* (2013.01)

(58) Field of Classification Search
CPC ... G05F 1/14; G05F 1/24; G05F 1/147; H01F 29/025; H01F 27/24; H01F 27/28; H01F 27/29
USPC ................... 323/225, 256, 257, 258
See application file for complete search history.

(56) References Cited

U.S. PATENT DOCUMENTS

| | | | | |
|---|---|---|---|---|
| 3,818,402 A * | 6/1974 | Golaski | ................... | H01F 29/02 336/147 |
| 4,628,438 A | 12/1986 | Montague | | |
| 2002/0034084 A1 | 3/2002 | Kogel et al. | | |
| 2011/0048356 A1* | 3/2011 | Merelle | ................... | F23Q 7/001 123/145 A |
| 2011/0172660 A1 | 7/2011 | Bales, Jr. | | |
| 2014/0077913 A1* | 3/2014 | Weber | ..................... | H01F 29/02 336/170 |

OTHER PUBLICATIONS

Goodman, J. PCT Application: PCT/US18/50124 Transformer System With Dynamic Control, ISA Report.

* cited by examiner

*Primary Examiner* — Nguyen Tran
(74) *Attorney, Agent, or Firm* — Brian Billett

(57) ABSTRACT

The regulation, power-handling capability, and reliability of a transformer is improved by a connected switching network which changes the effective numbers of turns and effective wire size of the windings synchronously during each cycle of an applied AC input voltage.

15 Claims, 17 Drawing Sheets

| | 396 | 397 | 398 |
|---|---|---|---|---|
| Configuration: | 1/6 | 2/18 | 3/31 | 4/31 |
| # of effective turns in the primary winding | 310 | 360 | 410 | 460 |
| # effective turns in the secondary winding | 185 | 245 | 310 | 310 |
| Turns ratio | 1.676 | 1.469 | 1.323 | 1.484 |
| primary winding resistance (ohms) | 2.75 | 4.33 | 5.80 | 7.37 |
| secondary winding resistance (ohms) | 0.96 | 1.46 | 2.07 | 2.07 |

Time ⟶

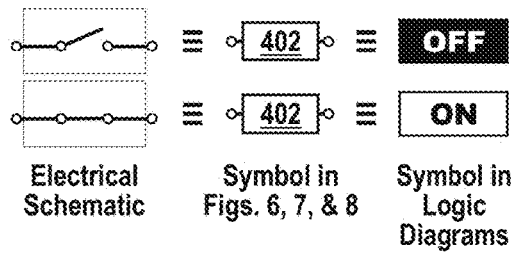
Fig. 6A
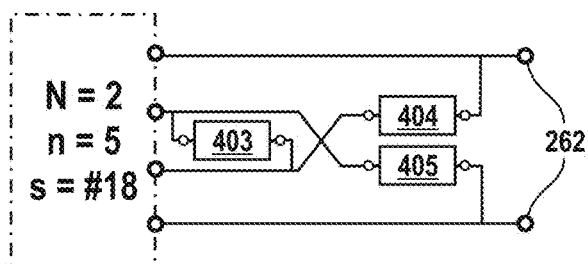
Fig. 6B
| Configuration | Parallel | Series |
|---|---|---|
| Effective # turns | n | 2*n |
| | State 0 | State 1 |
| Switch 403 | OFF | ON |
| Switch 404 | ON | OFF |
| Switch 405 | ON | OFF |
Fig. 6C
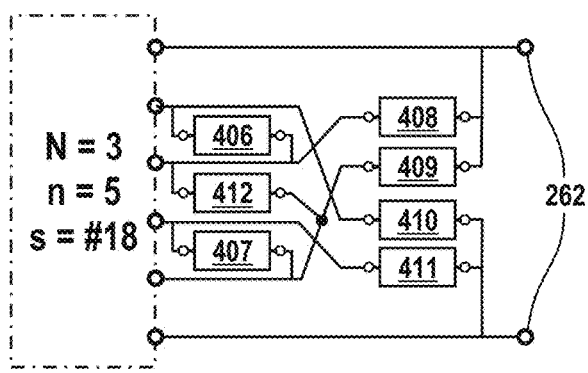
Fig. 6D
| Configuration | Parallel | Ser-Par | Series |
|---|---|---|---|
| Effective # turns | n | 2*n | 3*n |
| | State 0 | State 1 | State 2 |
| Switch 406 | OFF | ON | ON |
| Switch 407 | OFF | OFF | ON |
| Switch 408 | ON | OFF | OFF |
| Switch 409 | ON | OFF | OFF |
| Switch 410 | ON | OFF | OFF |
| Switch 411 | ON | ON | OFF |
| Switch 412 | OFF | ON | OFF |
Fig. 6E

| Secondary state → | Primary state # turns ohms | | 1 310 2.753 | 2 360 4.327 | 3 410 5.798 | 4 460 7.373 |
|---|---|---|---|---|---|---|
| | sec. turns | sec. ohms | Primary/secondary turns ratio | | | |
| 0 | 155 | 0.669 | 2.0000 | 2.3226 | 2.6452 | 2.9677 |
| 1 | 160 | 0.718 | 1.9375 | 2.2500 | 2.5625 | 2.8750 |
| 2 | 165 | 0.767 | 1.8788 | 2.1818 | 2.4848 | 2.7879 |
| 3 | 170 | 0.817 | 1.8235 | 2.1176 | 2.4118 | 2.7059 |
| 4 | 175 | 0.861 | 1.7714 | 2.0571 | 2.3429 | 2.6286 |
| 5 | 180 | 0.910 | 1.7222 | 2.0000 | 2.2778 | 2.5556 |
| 6 | 185 | 0.960 | 1.6757 | 1.9459 | 2.2162 | 2.4865 |
| 7 | 190 | 1.009 | 1.6316 | 1.8947 | 2.1579 | 2.4211 |
| 8 | 195 | 1.042 | 1.5897 | 1.8462 | 2.1026 | 2.3590 |
| 9 | 200 | 1.091 | 1.5500 | 1.8000 | 2.0500 | 2.3000 |
| 10 | 205 | 1.140 | 1.5122 | 1.7561 | 2.0000 | 2.2439 |
| 11 | 210 | 1.190 | 1.4762 | 1.7143 | 1.9524 | 2.1905 |
| 12 | 215 | 1.234 | 1.4419 | 1.6744 | 1.9070 | 2.1395 |
| 13 | 220 | 1.283 | 1.4091 | 1.6364 | 1.8636 | 2.0909 |
| 14 | 225 | 1.332 | 1.3778 | 1.6000 | 1.8222 | 2.0444 |
| 15 | 230 | 1.382 | 1.3478 | 1.5652 | 1.7826 | 2.0000 |
| 16 | 235 | 1.362 | 1.3191 | 1.5319 | 1.7447 | 1.9574 |
| 17 | 240 | 1.412 | 1.2917 | 1.5000 | 1.7083 | 1.9167 |
| 18 | 245 | 1.461 | 1.2653 | 1.4694 | 1.6735 | 1.8776 |
| 19 | 250 | 1.510 | 1.2400 | 1.4400 | 1.6400 | 1.8400 |
| 20 | 255 | 1.554 | 1.2157 | 1.4118 | 1.6078 | 1.8039 |
| 21 | 260 | 1.604 | 1.1923 | 1.3846 | 1.5769 | 1.7692 |
| 22 | 265 | 1.653 | 1.1698 | 1.3585 | 1.5472 | 1.7358 |
| 23 | 270 | 1.702 | 1.1481 | 1.3333 | 1.5185 | 1.7037 |
| 24 | 275 | 1.735 | 1.1273 | 1.3091 | 1.4909 | 1.6727 |
| 25 | 280 | 1.784 | 1.1071 | 1.2857 | 1.4643 | 1.6429 |
| 26 | 285 | 1.834 | 1.0877 | 1.2632 | 1.4386 | 1.6140 |
| 27 | 290 | 1.883 | 1.0690 | 1.2414 | 1.4138 | 1.5862 |
| 28 | 295 | 1.927 | 1.0508 | 1.2203 | 1.3898 | 1.5593 |
| 29 | 300 | 1.977 | 1.0333 | 1.2000 | 1.3667 | 1.5333 |
| 30 | 305 | 2.026 | 1.0164 | 1.1803 | 1.3443 | 1.5082 |
| 31 | 310 | 2.075 | 1.0000 | 1.1613 | 1.3226 | 1.4839 |

Fig.9

TRANSFORMER SYSTEM WITH DYNAMIC CONTROL

CROSS-REFERENCE TO RELATED APPLICATIONS

This application claims the benefit of U.S. Provisional Application 62/561,397, filed Sep. 21, 2017, which is incorporated herein in its entirety.

FIELD OF THE INVENTION

The field of this disclosure relates generally to electrical transformers.

BACKGROUND

An electrical transformer is a device for taking electrical power from a source of alternating voltage (with a zero average value) and delivering it to one or more (primarily resistive) loads as efficiently as possible. It may also alter the root-mean-square (rms) voltage from the source value to potentially different values for each load, and it may provide galvanic isolation of each load from one another and from the source. Power efficiency and regulation are relevant to the performance of electrical transformers in numerous applications.

SUMMARY

The power-handling and regulation of a conventional transformer is improved utilizing a conventional transformer core in combination with the disclosed dynamic controller utilized for modifying the utilized primary and secondary windings during operation. Disclosed is a system for dynamically controlling sub-winding configurations that present many external connection points which are connected through a switching network to the source and load(s). The disclosed controller configures operating sub-windings with various effective numbers of turns in the primary and any secondary windings multiple times during a cycle of the AC input source voltage.

BRIEF DESCRIPTION OF THE DRAWINGS

FIG. 6A shows both a common schematic diagram for a single-pole, single-throw (SPST) switch and the symbol to be used in subsequent figures.

FIG. 6B shows an embodiment of the switch circuitry for a segment with N=2.

FIG. 6C shows an embodiment of the logic states for the two states of a segment with N=2.

FIG. 6D shows the switch circuitry for a segment with N=3 of the disclosed transformer system.

FIG. 6E shows the logic states for the three states of a segment with N=3 of the disclosed transformer system.

FIG. 9 is a chart of 128 possible primary and secondary winding configurations, showing the effective number of turns in both the primary and secondary windings, the turns ratios, and the primary and secondary winding resistances.

DESCRIPTION

Figure 1A:
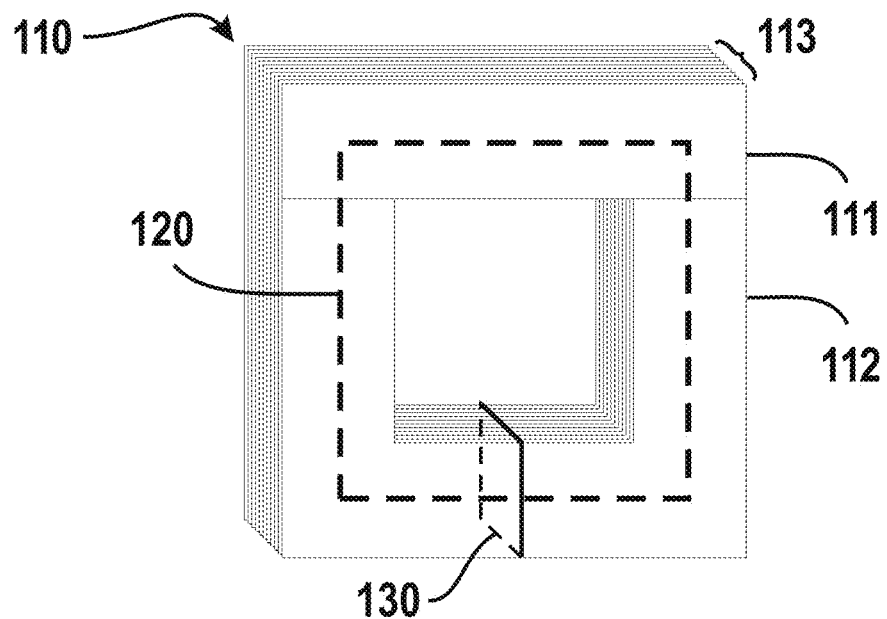
FIG. 1A depicts the core for a conventional electrical transformer.

The following is a glossary of terminology used in this disclosure:

Transformer 100: a magnetic core linked to one or more windings, (and for any embodiment in accordance with the present invention, the required snubber), and the connection points permitting external access to the sub-windings that comprise the windings.

Transformer System 101: a transformer, switching network, and a controller able to change the transformer system's configuration.

Core (or Magnetic Core) 110: a region filled with highly magnetizable material surrounding one or more openings through which wires may be passed. and having a defined magnetic circuit length around each such opening.

Turn: a length of electrically conductive material (a wire) that links to the core by passing through one of its openings a single time.

Sub-winding 230: a series connection of a number of turns, all of which are linked to the core through the same opening (hence, a length of wire that passes through that opening in the core multiple times).

Segment 250: comprises one or more sub-windings. If it includes more than one sub-winding, all of its sub-windings must have the same number of turns. These sub-windings may at different times be connected by the switching network into any of several arrangements (in parallel, in series, or in a series-parallel combination, or they may be disconnected from one another).

Winding 200: an entire series-connected set of segments that may be attached to a portal to the transformer system that is either connected to a source of alternating voltage electricity (a primary winding), or to a load (a secondary winding). In the present invention, the detailed structure of each such winding can change, as directed by the associated controller, in order to alter the effective number of turns in each such winding, or to disconnect at least one end of the winding from the external portal (where the source and the loads connect).

Tap 240: a connection point between a junction of segments within a winding other than at either of the winding's ends and a portal where devices (a source or a load) may be connected to the transformer system.

Connection Point 260: a terminal connected internally to an end of a sub-winding. Each segment containing N sub-windings necessarily has 2N connection points, two of which may also be designated as end connection points for that segment. When two segments A and B are permanently joined by their end connection points (to make up a portion of a winding), those two connection points become, in effect, a single connection point. That connection point may then serve up to three purposes. First it allows connection by the switching network to one end of one of the sub-windings in segment A. Next, it allows the switching network to connect to one end of one of the sub-windings in segment B. Third, it may serve as a tap at which the one end of the source of input voltage or one end of a load may be connected to the transformer. An end connection point of a segment that is not permanently connected to another segment will, perforce, be one end of the winding of which this segment is a part.

Switching Network 400: a collection of switches controlled by the disclosed transformer system controller and serving [1] to connect the power source to the primary winding of the transformer and the load(s) to the secondary winding(s), and [2] to connect the sub-windings in each of the segments comprising those windings into any of several configurations in order to provide each of the primary and secondary windings with the desired effective numbers of turns. Among these configurations there shall be one in which none of the sub-windings is able to carry current (other than current through the snubber and the sub-winding to which the snubber is attached). This configuration is the ALL OFF configuration and it is entered (very briefly) between each of the other configurations.

Transformer System Controller 500: a micro-computer which receives data from various sensors and issues commands to the switching network under program control.

Transformer Configuration: a specified effective number of turns on each of the windings of the transformer. The controller selects a configuration, based on sensed data about the input and output voltages, the output currents (on each secondary), and [optionally] the temperatures of various parts of the disclosed transformer system, and it then directs the switching network to interconnect the sub-windings in a manner that creates the desired effective number of turns on each winding.

Effective number of turns for a winding, segment or tapped portion of a winding: this is, fundamentally, the ratio of the induced voltage across that item divided by the induced voltage across a single turn at any given moment in time. It also can be computed in each case as described below.

Effective number of turns for a segment: this is a non-negative integer multiple of the number of turns in each of its sub-windings, with the integer being the number of sub-windings that are connected in series (equal to one if all of those sub-windings are connected in parallel, and equal to zero if they are disconnected).

Effective number of turns for a winding: this is the sum of the effective number of turns for each of the series-connected segments that comprise the winding.

Effective number of turns for a tapped winding: this is the sum of the effective number of turns for each of the series-connected segments that comprise the portion of the winding between a designated one of the winding's ends and that tap location.

Typically, transformers consist of a magnetic core (comprising a magnetizable circuit with one or more openings through which wires can be passed), and one or more windings formed by repeatedly passing the wires that make up those windings through those openings. FIG. 1A shows a simple magnetic core 110, in this case a square ring made out of a stack of many thin "laminations" with an average length around the ring 120 and a constant cross-sectional area, 130. In a typical transformer the individual layers of the lamination stack 113 are made in two parts that can be fitted together—here shown as a U-shape piece 112 (called a U-lam, or if were rotated 90 degrees, a C-lam) topped by a simple rectangle 111 (called an I-lam). Normally, on successive layers of the lamination stack the C and I sections of the lamination are swapped (which amount to saying that the lamination pair is rotated 180 degrees from one layer to the next). Then the stack is commonly bolted together (through holes not shown here) and/or encased in a resin binder to hold all of the lamination pieces together.

Figure 1B:
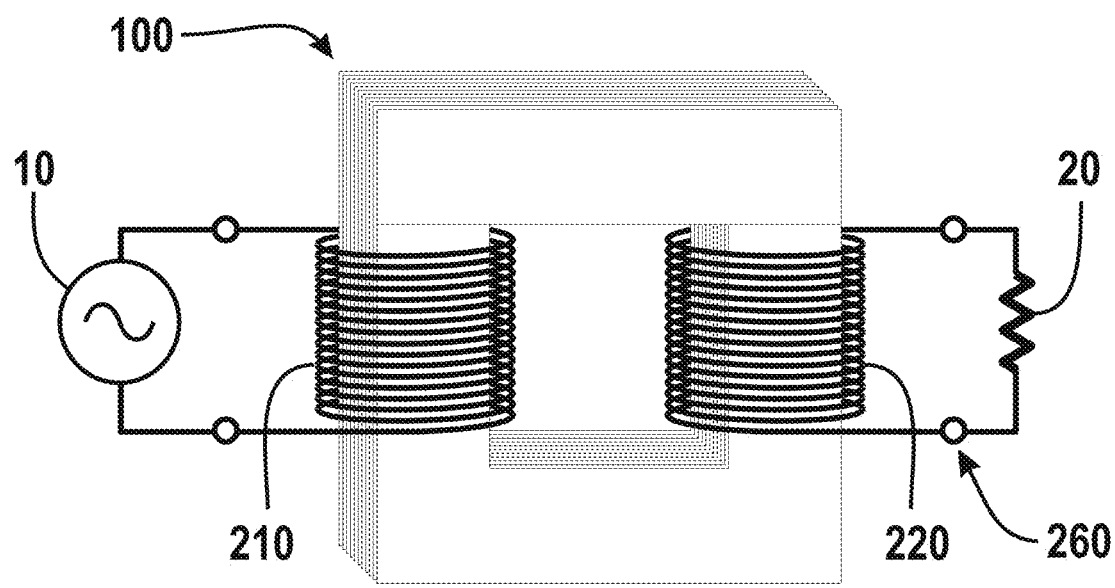
FIG. 1B depicts the conventional transformer core in FIG. 1A with two windings added, plus a source connected to the primary windings and a load connected to the secondary winding and showing the connection points between them.

In FIG. 1B there are two windings added to this core, in this case located on opposite sides of the ring, for visual clarity. (Commonly, the two windings would be layered one on top of the other. The windings are wound on one or more bobbin(s)—not shown here—and then the laminations are assembled together through the bobbin(s) to link those windings to the core created by the stack of laminations.)

If one were to stick together two such C-lam pieces one above the other and then wind the primary and secondary windings around the two adjacent arms of those lamination pieces, one would have effectively created what is perhaps the most common core design, the so-called E-I transformer core. No matter what the core design, the transformer operates according to the same principles.

For a single-phase transformer, the winding that is connected to the power source 10 is termed the "primary winding" 210 and all of the other windings (in this case the only other one) are termed a "secondary winding" 220, here shown connected to a load resistance 20. Also shown here are the four connection points 260 where the input source and output load attach to the transformer. Throughout the figures, a small black circle with white inside sitting on top of a black line represents a similar connection point. (A solid black small circle over a junction of two black lines represents a permanent connection of those two wires. Otherwise, when two black line simply cross, they should be assumed to be not connected to one another.)

For a three-phase transformer there will be three primary windings connected to the three different phase sources of input voltage and at least three secondary windings connected to the output loads. Each of the three primary windings and all of its associated secondary windings are linked to the core through a different opening (or pair of openings), each with its own magnetic circuit length and core cross-sectional area.

The principles of operation of each of the three phases are sufficiently similar to that of a single phase transformer that, for the remainder of this discussion only a single phase transformer need be described. The concepts discussed here apply equally to each of the phases on a three-phase transformer. Likewise, the improvements disclosed herein, also apply equally to either single- or three-phase transformers.

Applying the source voltage to the primary causes a "magnetizing current" to flow in the primary, which creates a magnetic field, H (field strength), which in the core becomes a large B (flux density). The rate of change of this B times the cross-sectional area of the core induces a voltage (the "back emf") across each turn of every winding that is threaded through the same opening in the core. This magnetizing current will rise or fall at just the rate that makes the induced voltage plus the ohmic voltage drop (which is the current times the primary winding resistance) exactly equal to the applied voltage.

The induced voltage in the secondary winding forces a "load current" to flow in the load resistance connected to the secondary. That current creates another magnetic field which is exactly cancelled by a corresponding load current induced in the primary. The ohmic voltage drop across the primary is given by the sum of the load and magnetizing currents in that winding times the resistance of the primary winding.

The transformer's designer is faced by a challenge. The core material has a very high permeability (making a lot of B flux density for a given H field) only up to a certain a threshold value of B (sometimes termed the knee of the B-H curve, or the beginning of saturation of the core). Very much above that value the permeability falls precipitously. Below saturation, or only slightly into saturation, just a modest magnetizing current will suffice to create the needed induced voltage if there are enough turns in the primary winding and enough cross-sectional area to the core.

If there are too few turns in the primary winding, the core will heavily saturate and the magnetizing current will become enormous, enough to create unacceptable ohmic losses, and perhaps even burn up the transformer. But lots of turns and the limited amount of space in the core's "winding window" (the opening through which the winding's turns are threaded) means one must then use a very long piece of very fine wire, which makes the primary winding resistance large. Then the load current plus the magnetizing current will create too much ohmic loss in that winding, and that might again burn up the transformer.

So the designer must choose a compromise number of turns for the primary winding. Enough to avoid deeply saturating the core, but no more than necessary, so as to enable as much load current as possible before the transformer overheats. In addition, the designer must take into consideration the fact that the primary and secondary winding resistances cause the output voltage to fall under heavy load, as the ohmic voltage drop across both windings reduces the voltage delivered to the load. So any normal design will have acceptable "power efficiency" (percent of power drawn from the source that is delivered to the load) and acceptable "regulation" (percent of unloaded voltage that appears across the load) only for loads less than some maximum design limit.

If there is no load attached to the secondary winding(s), the only current flowing in the primary winding is whatever magnetizing current is necessary to create a back emf which, subtracted from the input voltage, leaves just enough voltage to force that much magnetizing current through the primary winding resistance.

Once a load is attached to the secondary winding, a load current will flow there (equal to the secondary emf divided by the sum of the load resistance and the secondary winding resistance) which will also induce a load current to flow in the primary. This happens because the secondary load current creates an H magnetic field which must be almost exactly canceled by the H field created by the corresponding primary load current, since the magnetizing current in the primary is creating precisely the necessary H field to make the necessary back emf. Since the H field magnitude is given by the current times the number of turns divided by the magnetic circuit length, the amps times turns is what must match between the primary and secondary load currents. (Actually, since the primary load current added to the magnetizing current drops somewhat more voltage across the primary winding resistance, the needed back emf is reduced somewhat, meaning the rate of change of the magnetizing current will decrease slightly.)

This means that, although one cannot directly measure the primary load current separate from the primary magnetizing current, one can easily infer it from the measured secondary load current and the known number of turns in the primary and secondary windings. Then the magnetizing current can be inferred by subtracting the primary load current from the total primary current.

Figure 2:
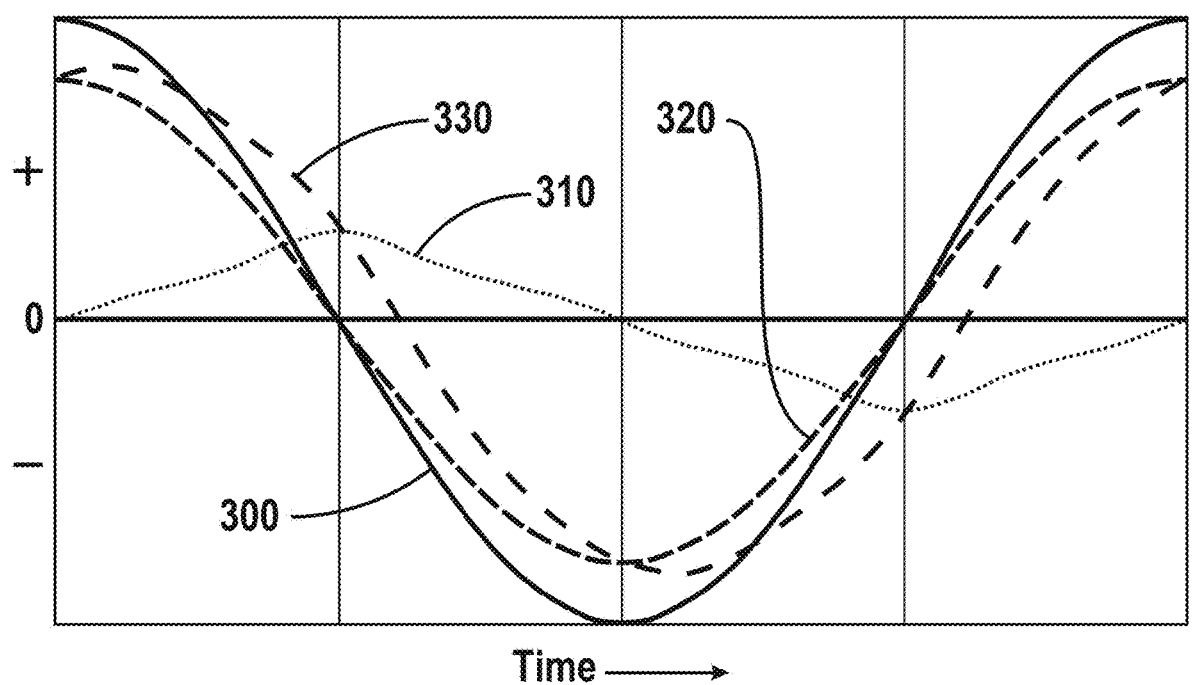
FIG. 2 depicts the waveforms for one cycle of the input voltage showing both input voltage and the components of the primary current in a conventional transformer that is lightly loaded. The non-sinusoidal form of the magnetizing current waveform shows that the core is saturating near the zero-crossings of the input voltage, but only modestly.

FIG. 2 shows the input voltage 300, the magnetizing current 310, the inferred load current in the primary 320, and the total primary current 330 of a typical conventional transformer for one cycle of the input voltage (for some assumed load resistance).

Shown in FIG. 2 is that, since only the rate of change in the magnetization of the core produces the induced voltage, the magnetizing current must peak when the induced emf is zero, which is very nearly when the input voltage is zero. This is necessarily about 90 degrees out of phase with the input voltage, whereas the load current (for a resistive load) is essentially in phase with the input voltage.

If the load is not purely resistive, the load currents in both the primary and secondary windings can be thought of as having two components: One component is in phase with the input voltage and the other is 90 degrees out of phase. Both phases contribute to the heating of the windings in the transformer, but only the in-phase component transfers power to the load. (Essentially, the out of phase component simply "borrows" power for a short time and then returns it later in the cycle, but all of the time it heats up the windings.) Since the purpose of a transformer is to deliver power as efficiently as possible, it is highly desirable to have the load be essentially resistive. This is commonly referred to as having a load with a unity power factor, and it is often worth money to make that the case, leading to sometimes great efforts to "power factor correct" the load.

Figure 4:
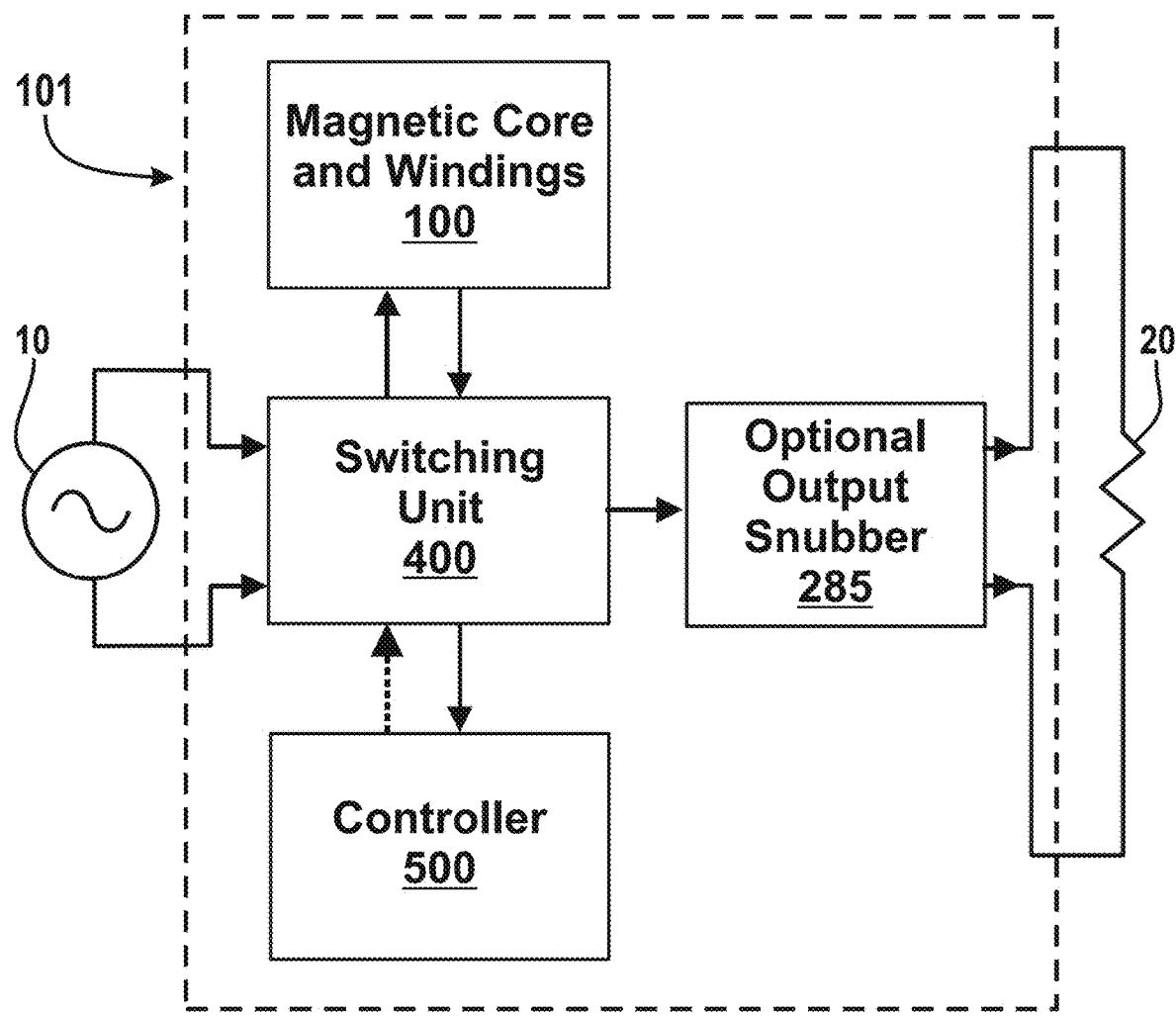
FIG. 4 shows a block diagram of an embodiment of the disclosed transformer system.

FIG. 4 shows a block diagram of the transformer system. The heavy solid lines show the flow of power from the source 10 to the load 20 and to the controller 500 via the switching network. The dashed heavy line shows that information flows from the controller to the switching network to enable the functionality of this transformer system.

Thus, in each quarter-cycle, and for any nearly purely resistive load, as the voltage and load current (which are then in phase with one another) rise or fall from their peak (positive or negative) value to zero, the magnetizing current does the exact opposite. So, the times at which the magnetizing current is maximal are precisely the times when the load current is minimal, and vice versa. This aspect of transformer behavior is notable and in part lead to the development of various embodiments of the disclosed dynamic controller.

If only one could have a smaller number of turns (and a correspondingly smaller primary winding resistance) when the load current is large, and then have a larger number of turns when the magnetizing current was large, it appears that one could reduce the ohmic losses in the windings, while still keeping the core from saturating too much. This should allow the transformer to transfer significantly more power to the load before it overheats, and generally to operate with greater power efficiency at all loads.

Typically, conventional transformers have a fixed number of turns on the primary and each secondary winding. In some conventional transformers taps on the primary winding allow the user to connect to one of them plus the end of the primary to permit use of the transformer with a variety of input voltages. And once the source voltage is connected to any particular tap, the effective number of turns on that winding typically remains fixed. Further, it is noteworthy that all of the original turns are still there on the primary and secondary windings no matter where the input source and output load are connected, there may be simply some of those turns that don't get used if the input voltage is anything less than the designed maximum value.

In various embodiments of the disclosed transformer system, the effective numbers of turns in the primary and secondary windings may be dynamically changed at any time during operation. Specifically, the disclosed transformer system is able to modify its operation several times per cycle of the input voltage to have more effective turns in the primary and secondary windings when the magnetization current is large and load currents are small, and to have fewer effective turns in the primary and secondary windings that when the magnetizing current is small. Various embodiments of disclosed transformer system may have winding configuration (effective numbers of turns on each winding) that are instantaneously alterable, plus a controller that will make those alterations synchronously on all the windings at once and do so at appropriate times in the middle of each quarter-cycle of the input voltage. And, furthermore, it is possible to make all of the turns in the physical winding carry current all of the time, no matter what effective number of turns that winding may have been configured to have. Various embodiments of the disclosed transformer system use the "winding window" to its maximum effect. Thus in various embodiments of the disclosed transformer system, the effective number of turns in each winding and the effective wire size may be changed at any time.

Benefits of the disclosed transformer system include improvements in power efficiency, regulation, and idle current performance. The disclosed transformer system is capable of operating with both more-nearly ideal behavior, and greater power handling than would otherwise be possible. As one example, by utilizing the control provided by the disclosed transformer system, it is possible to make the transformer have virtually perfect regulation, even with a 500% overload, and still waste about 20 to 30 percent less power than would be the case in a conventional transformer design.

Figure 3A:
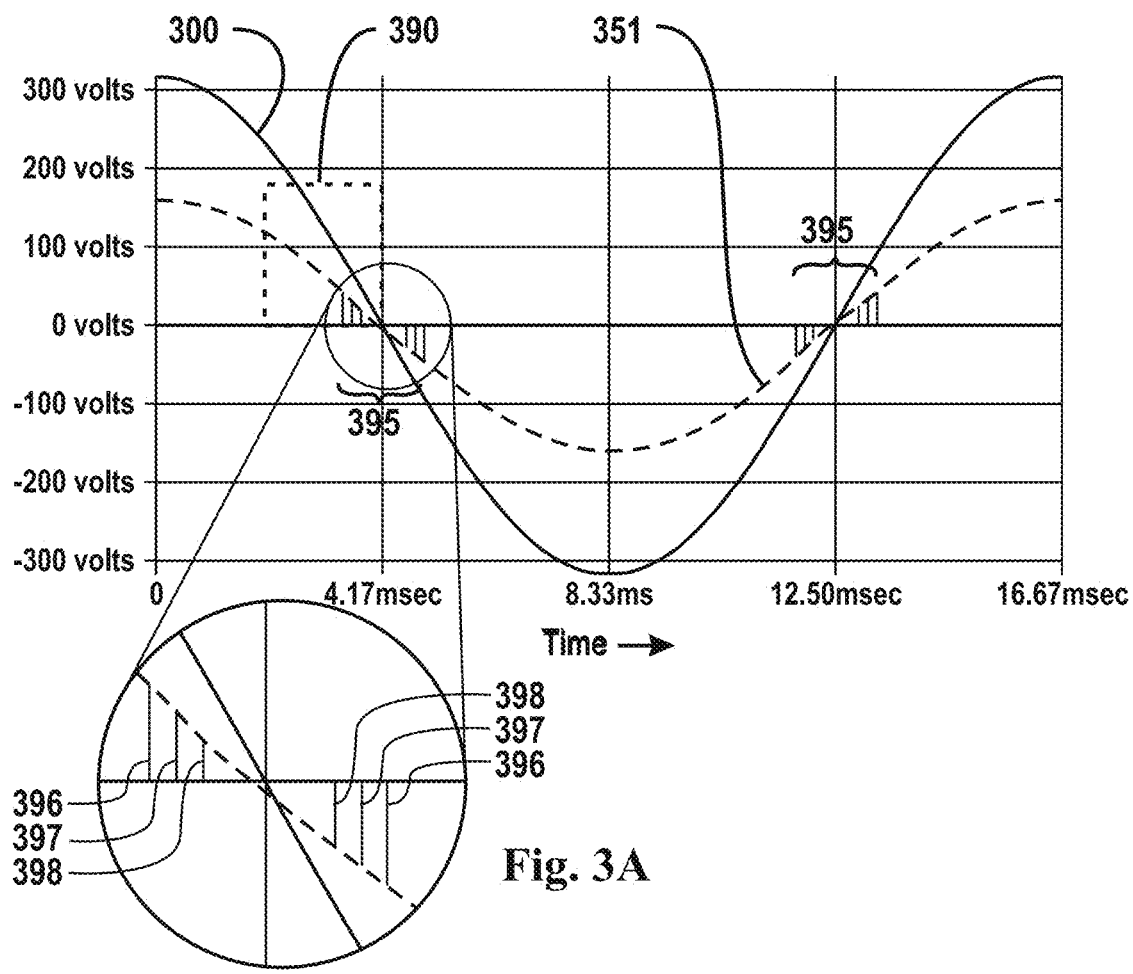
FIG. 3A depicts exemplar waveforms of the input voltage and the output voltage across the load for one cycle of the input voltage in an embodiment of the disclosed transformer system when the system is under a very heavy (about a 600%) overload.

FIG. 3A depicts the behavior of an embodiment of the disclosed transformer system during one cycle of the input voltage (in this case at 60 Hz) and for a particularly heavy output current (caused by a very low load resistance). The graph in FIG. 3A shows the input voltage 300 and the output voltage across the load 351. (The output voltage across the load is, in this case, noticeably less than the secondary induced voltage since the load resistance is only few times larger than the secondary winding resistance.) The inset circle below the main graph is an about 300% magnification of what is in the smaller circle on the main graph. Here you see the set of vertical lines 395 in the main part of FIG. 3A in this closer-up view. The different numbers for each of these lines in the inset indicate that the configuration of the transformer system is, in this case, starting in primary state 1, then switching up to primary state 2 at the line 396, and then to primary state 3 at line 397, and finally to primary state 4 at line 398, all before the input and output voltages cross zero. Thereafter the transformer system steps back down through those same four primary states in reverse order. The same sequence of stepping up through all four primary states and then back down again also happens at the next zero crossing of the input and output voltages. This shows that the effective number of turns in the primary winding is at its lowest value when the input and output voltages (and therefore, the load currents) are at their maximum values (both positive and negative), and those effective numbers of turns are at a maximum as those voltages and load currents cross zero. Here the transformer system spends only about ten percent of the time in primary state 4 and only about four percent in each of the primary states 2 and 3. Over 80 percent of the time is spent in primary state 1 with the lowest effective number of turns and, more importantly, with the lowest primary and secondary winding resistances. With such a large load current in each winding it is vital to keep those resistances down, even though that means there will be more magnetization current than there would be with more effective turns in the primary, and it is equally vital to raise the effective number of turns when the load current is small, to keep that magnetization current from rising even farther.

If this transformer system were very lightly loaded, it would spend all or almost all of each cycle in the primary state 4, with the maximum number of turns, so as to minimize the magnetization current. For when there is little load current to dissipate power in the windings, it is important to keep the magnetization current small so it doesn't dissipate any significant power.

Figure 3B:
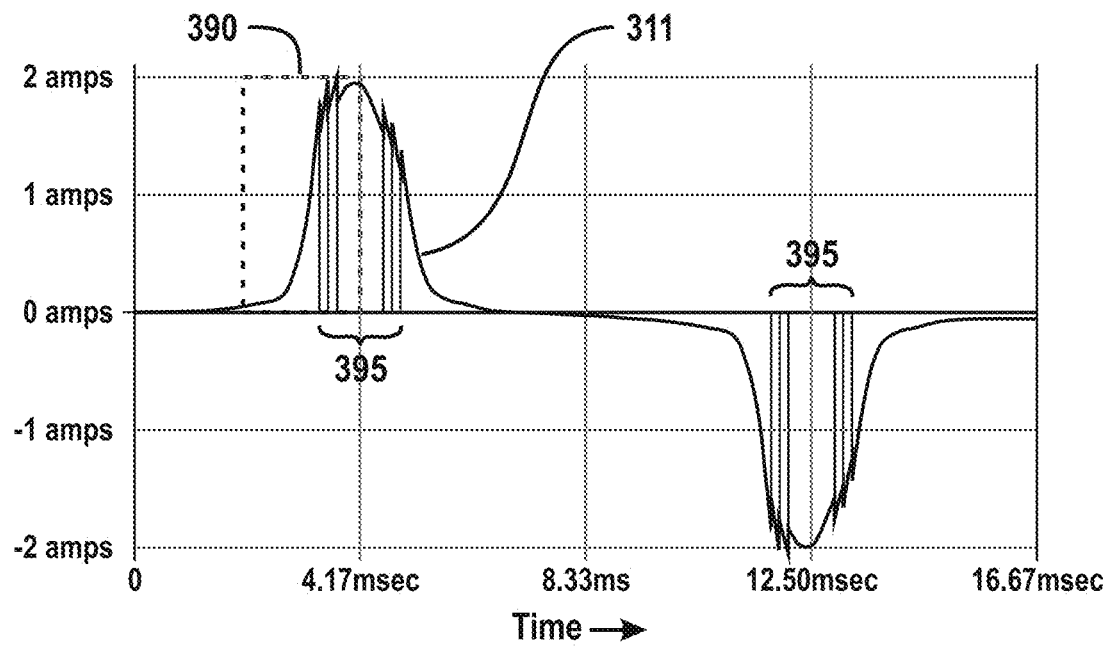
FIG. 3B depicts the waveform of the magnetizing current in the primary winding for the same embodiments and conditions as shown in FIG. 3A.

FIG. 3B is a depiction of the magnetization current 311 flowing in the primary winding of this transformer system. Shown here are vertical lines 395 indicating the same times as in FIG. 3A, demonstrating that the magnetization current maximum values (both positive and negative) occur while the transformer system is in primary state 4 (with the maximum effective number of turns in the primary).

Figures 3C, 3D:
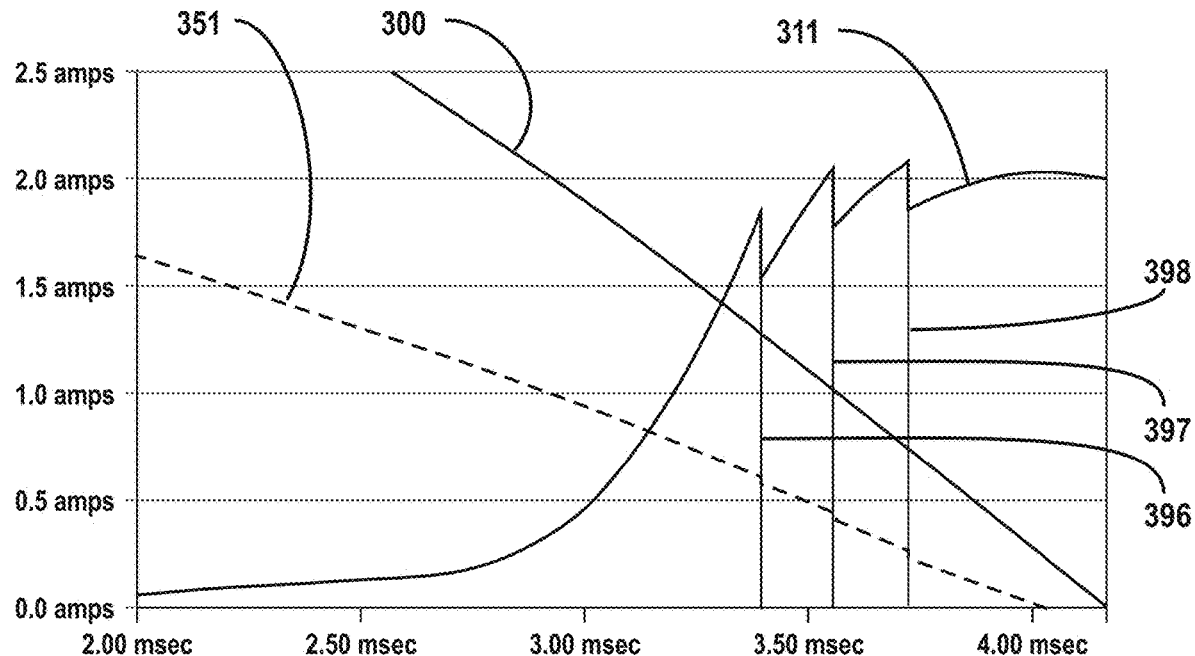
FIG. 3C shows a magnified view of the portion of the cycle indicated by the rectangular regions 390 surrounded by a dashed line in FIG. 3A and FIG. 3B. The peak load current through the load in this case is about 12 amperes. The peak magnetization current is about two amperes.
FIG. 3D is a chart showing the effective numbers of turns in the primary winding and secondary windings for the intervals in this quarter cycle of the input voltage when the system is in each of its four primary configuration states, as well as showing the corresponding ratio of primary to secondary effective turns and the resistance of the those windings for each of those configurations of the transformer system.

In both FIG. 3A and FIG. 3B there is a region 390 indicated by a dashed rectangle which covers a little more than the last half of the first quarter-cycle on the input voltage. FIG. 3C and FIG. 3D show in more detail what is happening during that interval. In FIG. 3C when the input voltage 300 and the output voltage across the load 351 are nearing their zero crossings, the magnetization current 311 falls as the effective number of turns in the primary rises at each of the times when the controller changes the transformer system's configuration (and how the output voltage across the load changes only smoothly, apart from the very brief interruptions as the transformer system is moving from one configuration to another.)

FIG. 3C reveals some small steps in the output voltage across the load at each of the switching times. These steps reflect the limited ability of this particular embodiment of the disclosed transformer system implementation to choose exactly the "right" configuration for any particular load resistance. The turns ratio line in FIG. 3D shows that these steps in the output represents a less than two percent change in the transformer's regulation at each of these switching times. With this particularly heavy load (10 ohms connected to a 115V output voltage), the secondary current is about 11.4 amps from a transformer whose core size suggests that normally it would only be able to deliver less than 1.8 amps without overloading, and with only the 128 possible configurations listed in FIG. 9 to choose from, and in particular with the lowest available turns ratio in primary states 3 and 4 (when the primary and secondary resistances are at their highest values) being only 1.32 and 1.48 respectively, there simply isn't a configuration available that gives the "right ratio" of primary to secondary effective numbers of turns for this case. The discussion below, explains this in more detail.

On the first line in the table in FIG. 3D the various transformer system configurations that are in use in this example embodiment implementation with this particular heavy load are indicated by a fraction, with the first number in the fraction (e.g., the 1 in "⅙") indicating the state of the primary winding and the second number indicating the state of the secondary winding, as these states are listed in FIG. 9. In the configuration that is in effect when the input and output voltages and load currents are maximum, the primary is in state 1 (with 310 effective primary turns) and the secondary is in state 6 (with 185 effective secondary turns) for an effective turns ratio of 1.68. And also in FIG. 3D you see the primary and secondary winding resistances of each winding in those configurations.

The numbers pointing to each of the vertical lines separating the columns of numbers in FIG. 3D indicate the same staircase stepping of the configuration's primary states as was shown in the inset in FIG. 3A and in FIG. 3C. At those switching moments there will be a very brief (sub-microsecond) interruption of the current flowing into the transformer from the source, and of the current flowing out to the load.

During each of those brief interruptions of the connections between the source and the primary winding and between the secondary winding(s) and the load(s), some magnetization current must continue to flow. This magnetization current will flow in whatever sub-winding has the snubber 280 permanently attached to it, and the amount of current that flows at the start of that interval times the number of turns in that sub-winding must exactly equal the magnetization current previously flowing in the primary winding 210 times whatever was the effective number of turns in that winding at that time. (So the magnetization current flowing through this sub-winding during the interruption interval will generally be a greater current than the magnetization current that had been flowing in the primary just before or after this switching interval, because the effective number of turns through which this current flows during the interruption interval is only the number of turns on the sub-winding to which the snubber is attached, and that will generally be at least somewhat less than the effective number of turns in the primary in any of transformer system's configurations.) The ampere-turns (current times effective number of turns) is what must be preserved in order to preserve the magnetic field in the core. It is the snubber that is permanently attached to the sub-winding that performs this essential service and thereby prevents any notable voltage spikes on any of the windings.

During the remainder of that brief interruption of the connections to the source and load, the magnetization current will continue to change at whatever rate is necessary to induce an emf across the snubber-connected sub-winding that, when added to the voltage drop caused by that magnetization current through the snubber resistance will exactly match the voltage on the snubber capacitor. But since that time interval is so small, only a little actual change in the magnetization current (or in the voltage on that capacitor) will take place before the interruption ends as the transformer system enters a new configuration with new values for the effective numbers of turns in the primary and secondary windings.

In various embodiments, an optional snubber 285 across the output can serve to accommodate similarly any inductive component of the load (which normally is very nearly purely resistive—a condition which may be accomplished by the inclusion of some power-factor correction circuitry in front of that load).

The various parts of FIG. 5 explain some of the words and symbols (used both in the text and in the figures) relevant to understanding the transformer system disclosed herein. FIG. 5A shows both a physical picture and a schematic representation of one single turn. In this simple picture the magnetic core 110 has just the one length of wire looped through the "winding window" a single time. The triple-bar "equal signs" indicates an exact equivalence between the symbol and the physical representation.

Figure 5A:
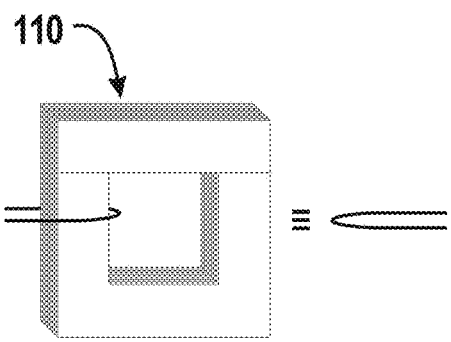
FIG. 5A shows a physical and a symbolic representation of a single turn of a disclosed winding.
Figure 5B:
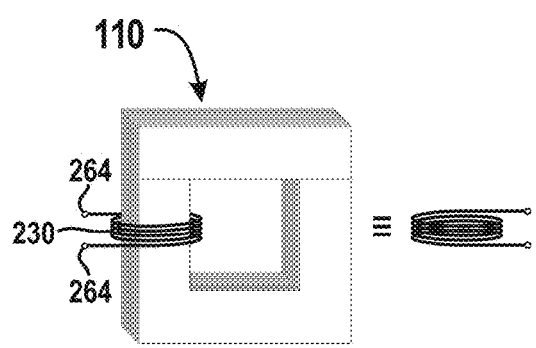
FIG. 5B shows a physical and a symbolic representation of a sub-winding.

FIG. 5B shows both a physical picture and a schematic representation of a sub-winding 230. The sub-winding 230 has two connection points 264. In describing a sub-winding there are two relevant parameters, first is the number of turns it comprises, symbolized here by n, and second is the wire size (using the American Wire Gauge [AWG] standard of wire sizes), symbolized here by s. The two end connection points are here labeled 264 since it is, at this point, indeterminate if they will be end points of a segment or internal connections points.

Figure 5C:
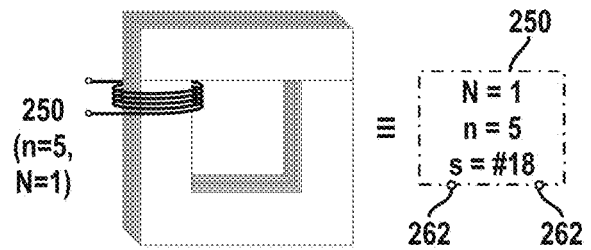
FIG. 5C shows a physical and a symbolic representation of three segments in an embodiment of the disclosed transformer system, one with one sub-winding, one with two sub-windings, and one with three sub-windings.
Figure 5C:
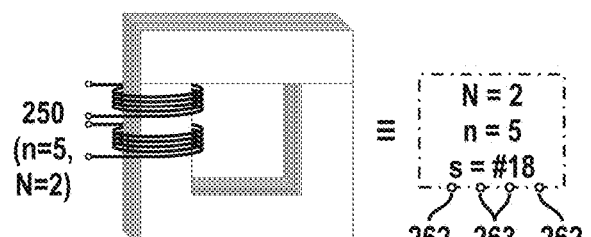
Figure 5C:
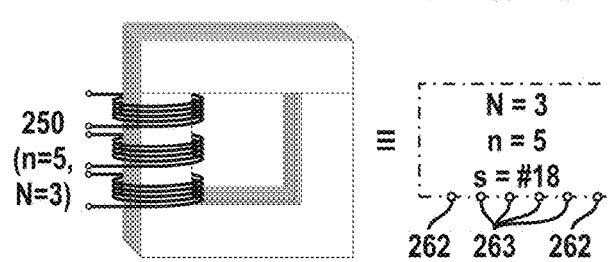

FIG. 5C shows both a physical picture and a schematic representation of several different segments 250 (shown in this and the subsequent figures by a dashed rectangle). In describing a segment there are three crucial parameters: the first is the number of sub-windings in that segment, symbolized here by N; next is the number of turns n in each sub-winding; and the last is the wire size parameters. (It is a part of the definition of a sub-winding that all of the sub-windings of which it is comprised must have identical numbers of turns; and in this discussion it is assumed that they also have an identical wire size.) In later figures the sub-windings are not indicated directly, instead the segments will be shown simply by the dot-dash-line box (with the segment's connection points) labeled with the values of N, n, and s, as shown on the right in FIG. 5C and in FIG. 5D.

Figure 5D:
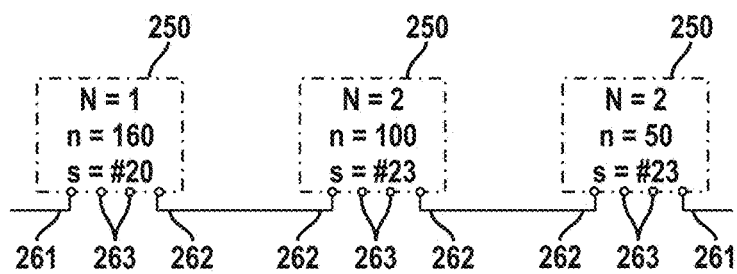
FIG. 5D shows a physical and a symbolic representation of a complete winding in an embodiment of the disclosed transformer system, in this case with three series-connected segments.

FIG. 5D shows how an entire winding (primary or secondary) can be represented as a series-connected set of segments. In particular, the winding shown here is the primary winding 210 of the example preferred implementation, detailed in FIG. 8. Notice that the end connection points of the string of segments are labeled by the number 261, whereas the other segment end points are labeled 262 and the remaining connections points (internal to each segment) are labeled 263.

Every segment necessarily has 2*N connection points (to allow full access to all of the sub-windings it contains). Those connection points are shown and identified in FIG. 5C (except that in FIG. 5C the top segment only has a single sub-winding, and so its only connection points are labeled 262) in FIG. 5D. They also will be shown in later figures where the segments are connected to switches.

FIG. 6A shows both a common schematic diagram for a single-pole, single-throw (SPST) switch and the symbol to be used in subsequent figures, for both the situation when the switch is open (OFF) and when it is closed (ON). For a more detailed schematic diagram of the particular electronic switches used in the example preferred implementation see FIG. 10.

FIG. 6B shows the switch circuitry necessary for a segment (with N=2). Here you see that three switches suffice to connect the two sub-windings either in parallel (for what is hereafter called state 0 of the segment) or in series (for what is hereafter called state 1 of the segment). In state 0 the segment has n effective turns and in state 1 it has 2*n effective turns. Notice that these two states are named after the only two possible values of a character in a binary (base 2) number.

FIG. 6C shows the logic states for the two states of the N=2 segment. Here when in state 0 the two switches 404 and 405 are ON and switch 403 is OFF, putting the two sub-windings in parallel, yielding an effective number of turns for the segment of n, or 5 turns for this segment. When all three switches are put in the reverse states, the two sub-windings are connected in series, yielding an effective number of turns for the segment of 2*n, or 10 turns for this segment.

FIG. 6D shows the switch circuitry necessary for a segment (with N=3). Here you see that seven switches are needed to connect the two sub-windings in parallel (for what is hereafter called state 0 of the segment), in series-parallel (for what is hereafter called state 1 of the segment), or in series (for what is hereafter called state 2 of the segment). In state 0 the segment has n effective turns; in state 1 it has 2*n effective turns, and in state 2 it has 3*n effective turns. Notice that these three states are named after the only three possible values of a character in a ternary (base 3) number.

FIG. 6E shows the logic states for the three states of the N=3 segment. The connections for state 0 and for state 2 are very similar to what you saw in FIG. 6C for the N=2 segment, putting the three segments either in parallel (yielding an effective number of turns for the segment of n) or in series (yielding an effective number of turns for the segment of 3*n). The only oddity here is that the "extra" switch 412 here is also turned OFF. If you reason through the logic table, you'll see that for state 1, the bottom two sub-windings are connected in parallel and then they are connected in series with the top sub-winding, thus leading to the middle state with an effective number of turns equal to 2*n.

In various embodiments of the disclosed transformer system, segments and switches may be combined. Disclosed here are two alternative embodiments which achieve a variable effective numbers of turns in the windings of a transformer. A simple disclosed embodiment, herein described as "method one" is based on a standard feature of many commercial transformers. An alternative disclosed embodiment, which is more efficient and safer is discussed below and referred to herein as "method two."

Transformers that are built to be sold into multiple markets often have a primary winding with several taps. The notion is that if your electric company supplies you with 240V(rms) AC then you connect to the primary at both ends. But if they give you 208V AC, then you can connect to one end and to a tap a short distance in from the other end of the primary. Similarly, there is a tap near the center of the primary for customers whose electric supply is at 120V.

Most commonly, the secondary windings aren't supplied with taps, except when there is a center tap provided, so the customer can, for example, ground that tap and have two outputs 180 degrees out of phase with one another. This can make filtering a rectifier output easier, to cite one benefit of this sort of tap.

The "method one" embodiment design begins with a conventional transformer core and bobbin. During manufacture of the transformer, taps in each winding are created during winding of the primary and secondary windings.

Figure 7:
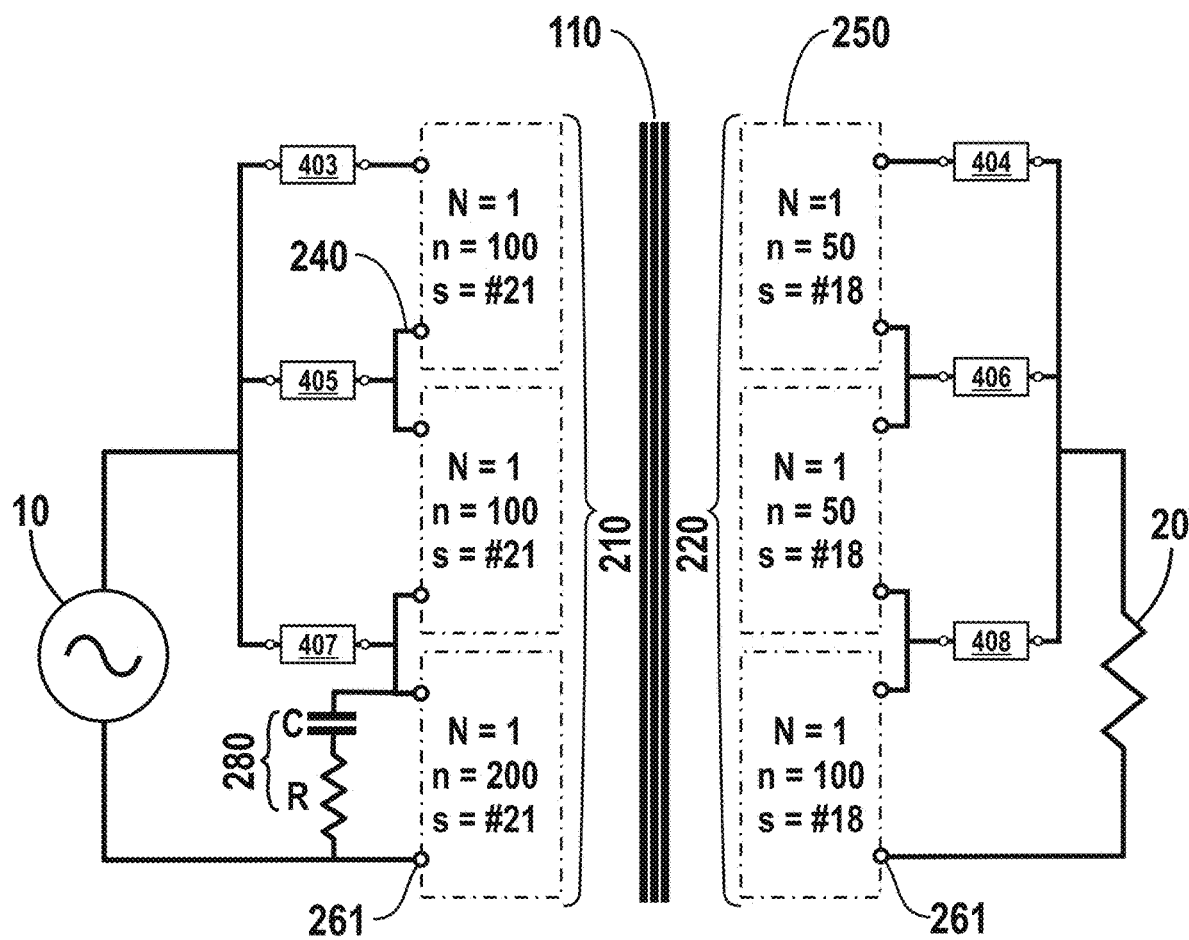
FIG. 7 shows an example of a disclosed configuration for changing the effective number of turns in both primary and secondary simultaneously.

FIG. 7 shows a simple example of the "method one" for manufacture of an embodiment of the transformer system which can change the effective number of turns in both primary and secondary simultaneously. Here, in the center, you see the transformer core 110. Immediately to its left you see three segments 250 connected in series, collectively creating the primary winding 210. And immediately to the right of the core is another series-connected string of segments, collectively creating the secondary winding 220. In this case, all of the segments have N=1, meaning they each contain only one sub-winding. Another way of expressing this is to say that the primary and secondary windings are simply a continuous wire wound many times through the core, and each have two taps 240 (where their segments join, one of which is identified in FIG. 7).

The source 10 and the load 20 are connected to the bottom terminals 261 of the primary and secondary windings. The upper end of the source 10 and the load 20 are connected to the primary and secondary windings through six switches 403 through 408. In a more general sense, one could have any number of segments 230 in each winding, with a tap 240 at each place the segments were joined, and with a corresponding number of switches connecting the source and load to those windings. And by switching ON one switch on each winding, with all the rest OFF, one can set the effective number of turns in both windings to any desired values (from among those for which there is a switch connection) simultaneously.

Here, if the switches 403 and 404 are ON, and all the rest are OFF, the full primary and secondary windings are connected to the voltage source and the load, respectively. If, instead, switches labeled 405 and 406 are ON (and the rest are OFF), the effective number of turns in each winding is reduced to three-quarters of the full value (for the segments as shown here). And if the switches labeled 407 and 408 are ON (and the rest are OFF), the effective numbers of turns in each winding drops to one-half.

For certain applications and embodiments, the use of a snubber is required. It is relevant to consider what happens when the disclosed switch settings are changed. For the disclosed transformer system, two or more of the switches to any winding should never be closed at the same time. If this condition occurred there would be a short circuit across some number of turns and the back emf across those turns would try to drive an enormous current through themselves, those switches, and the wire connecting the two switches—which is another way to create a catastrophic failure of the transformer. Thus, the transformer system is designed to open all the closed switches for a short time before closing any of the others. This design consideration raises another issue.

In the aforementioned condition, if there is any magnetizing current flowing at the time the switches open, that current would be interrupted. The magnetic field it created would almost instantly cease, and that very large rate of change of the magnetic flux through the windings would induce a nearly infinite voltage across those windings. In practice, what would happen is an arc would be created that would likely burn out the transformer.

In embodiments of the transformer system the above problem is solved by the addition of a snubber circuit. For these embodiments, a snubber circuit 280 is permanently connected across some sub-winding (preferably the sub-winding with the largest number of turns, whether it is some sub-winding in the primary winding or one of the sub-windings in the secondary). This snubber circuit may be as simple as a capacitor in series with a small resistor. In FIG. 7 the snubber 280 is shown connected to the bottom segment of the primary winding 210.

One way of describing an inductor is to say it "wants to keep its current flowing, and will create as much emf as necessary to insure that happens." Similarly, one can describe a capacitor by saying it "wants to keep the voltage across it constant, and it will supply as much current as necessary to insure that happens." Both statements are, of course, exaggerations and simplifications. Still the point is clear: If you want the current in the winding to continue when the switches connected to them opens, you'd best supply a path for that current to take. The capacitor will be charged at each instant to essentially the voltage across the winding to which it is attached (so long as the RC time constant is sufficiently small compared to the time of one cycle of the input voltage), and if the magnetic flux starts to change, the capacitor will supply whatever current it must to minimize that change.

The resistor in the snubber is there to limit the current that may have to flow when, after the transformer configuration is changed, the voltage across that sub-winding may suddenly be changed. For a very brief time (roughly a few times the value of R times C), a current starting at a value equal to that voltage difference divided by that resistance R and decaying exponentially thereafter will flow to reset the charge on the capacitor to what it must be to match the new sub-winding voltage. A small amount of energy will be burned up in that resistor during this brief time. That amount is proportional to the square of the voltage difference times the value of the capacitor. In practical terms it is an utterly trivial amount for a transformer system designed according to this invention. The reason is that the switches can operate in a small fraction of a microsecond, and they are only called upon to act a few hundred times per second. So almost all of the time, the snubber is doing pretty much nothing.

Embodiments of the transformer system manufactured according to "method one" may have certain shortcomings. It is possible when the "method one" is utilized for certain applications that a catastrophic failure of the switches may occur. For example, if one wishes to have a large percentage variation in the effective number of turns, this implies that there will be at least one tap on each winding very near the "bottom" end (the end that is connected to the supply or the load not through a switch). When you activate this pair of taps, the windings each act like an autotransformer. Since only a small fraction of their turns are receiving a back emf roughly equal to the applied voltage, and since every turn of every winding on that core experiences the same back emf per turn, the overall voltage on one or more of the windings may well exceed the maximum voltage the switches connected to the "upper end" of those windings can safely handle when they are turned off. This could cause those switches to fail catastrophically, thus destroying the transformer system's ability to function.

A second consideration for implementation of the transformer system is efficacy of the system. A reason to lower the effective number of turns is to reduce the winding resistance. Connecting to a tap at say, the middle of the winding will reduce the effective number of turns by a factor of two, and it will also lower the resistance by the same factor.

In certain applications of the disclosed transformer system, the "method one" designed embodiments (shown in FIG. 7) may not be the optimum way to achieve variable effective numbers of turns. As an explanation, the portion of the so-called "winding window" of the core that is assigned to this winding will be filled with all of its turns, but if a tap is used, current flows only in some fraction of those turns. To reduce the resistance as much as possible the space in the "winding window" should be used efficiently—every turn should carry current all of the time that any turn does.

As an alternative embodiment the winding may be divided into two separate pieces, each with exactly the same number of turns. This embodiment uses switches that could connect windings to the supply or to the load either in parallel or in series. In a parallel connection the effective number of turns would be halved, as in the previously disclosed embodiment, but the winding resistance would be knocked down to only one-quarter of the value it has when those sections are connected in series. This happens because all of the copper in that winding's share of the "winding window" is sharing in the current flowing through that winding.

Said a different way, in this embodiment, once a designer chooses the "winding window" area to be dedicated to a particular winding, and decides how many turns it must have, that implies both the length of the wire needed and its cross-sectional area. The resistance of that winding is simply the length of the wire divided by its cross-sectional area and multiplied by the material's resistivity. This embodiment can provide for a lower resistance either by reducing the length (which fewer turns of the same small wire will do) and even more by also using fatter wire. In this embodiment, the otherwise unused turns of the winding are connected in parallel with those that are being used to effectively make the wire fatter (lower gauge).

Figure 8A:
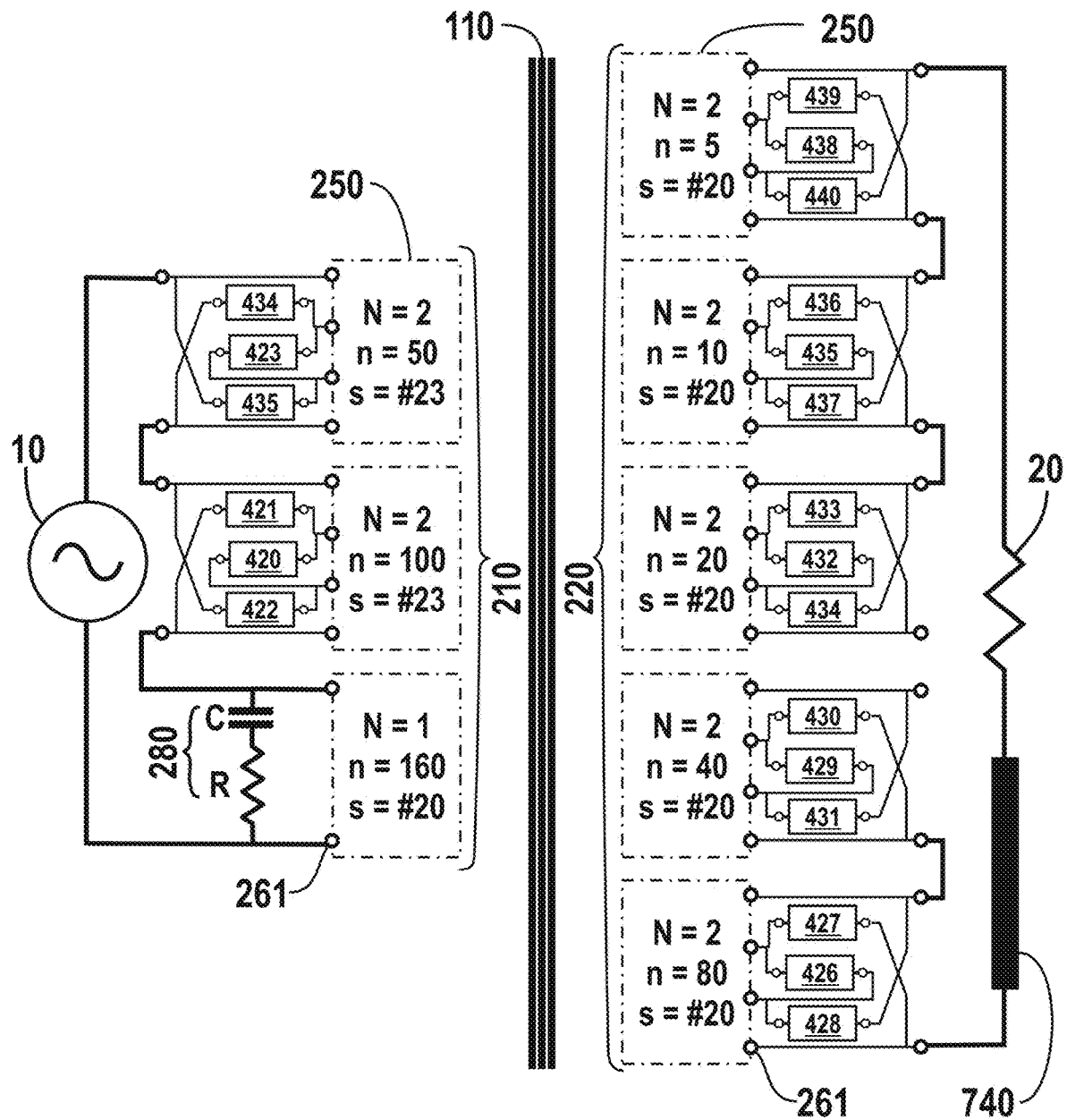
FIG. 8A shows an example of another disclosed configuration for changing the effective numbers of turns in both the primary and secondary windings simultaneously. This example uses a conventional magnetic core and bobbin, with fifteen windings (all but one would in a bifilar manner) and 21 switches to give great flexibility in selecting the effective numbers of turns in each winding and the resulting turns ratios.
Figure 8B:
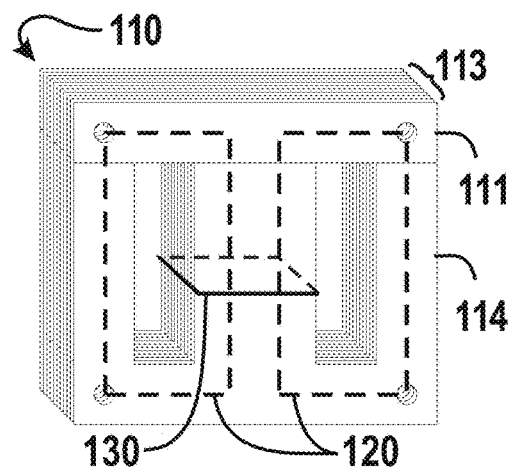
FIG. 8B shows how the very popular E-I magnetic core is essentially the same as using two U-I cores side by side, thus creating two winding windows.
Figure 8C:
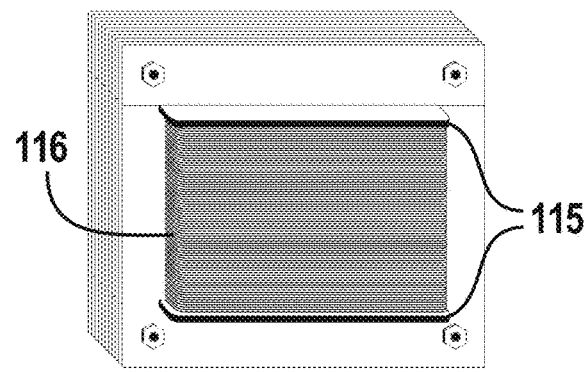
FIG. 8C shows the core in FIG. 8B after assembling it through a bobbin filled with windings. Only the bobbin end flanges 115 and the outermost layer of the windings 116 are visible here.

In this alternative embodiment—"method two"—any section of a winding that consists of two or more sub-windings having equal numbers of turns and able to be connected (by external switches) either in series or in parallel (or with more than two sub-windings, in some series-parallel arrangement) is referred to as a "segment" 230. The whole winding could then be made up from a series connection of several such segments, plus optionally, a segment with only one sub-winding. (All of the segments in the primary and secondary windings in FIG. 7 and just the bottom segment of the primary winding in FIG. 8A are single sub-winding segments).

For these alternative embodiments, if the whole winding consists only of segments each of which has two sub-windings in it (for example, the secondary winding in FIG. 8A), the overall effective number of turns for that winding can be changed by at most a factor of two. (The maximum effective number happens when all the segments connect their sub-windings in series; the minimum when they all connect them in parallel.) And, the ratio of the maximum to minimum winding resistance in that case will be four to one.

For applications that indicate a preference for a larger ratio between the maximum and minimum resistances, the embodiment should implement a greater ratio between the maximum and minimum effective number of turns. This can be achieved by having more than two sub-windings per segment. If there are three sub-windings for each of the segments, a max to min ratio of turns of 3:1 is possible, with a corresponding 9:1 resistance ratio.

Figure 8D:
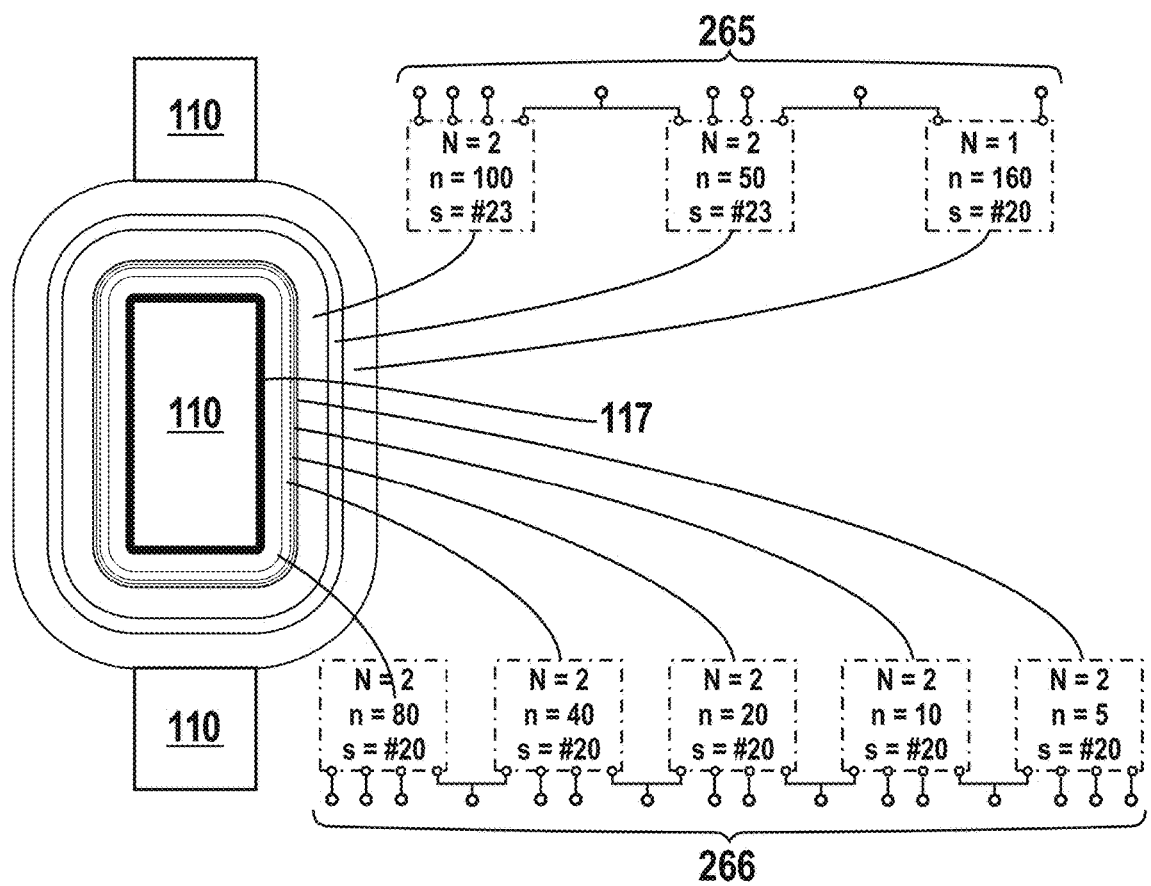
FIG. 8D shows both a cross-sectional view looking down the center leg of the E-laminations with the locations of the eight segments of the primary and secondary windings indicated, and a repeat of the segment identifications from FIG. 8A. The bobbin core 117 is visible between the core 110 and the innermost segment windings.

In FIG. 8D you see how these segments are wound in this exemplar disclosed embodiment, with each of the N=2 segments wound on the bobbin successively, starting with the five secondary winding segments in decreasing order of n values. Then the primary winding segments follow starting the N=2 segment with the larger n, followed by the other N=2 segment, and finally the N=1 segment.

Notice how, although there are five segments 250 each with two sub-windings 230 in the primary winding 210, which have, of course, ten ends, there are only 8 connection points 265 that are connected to the switching network 400. Likewise, since the secondary winding has ten sub-windings with 20 ends, there are only 16 connection points in the group 266 that connect to the switching network 400 (see FIG. 4).

Selection of an optimal turns ratio is a design consideration. The turns ratio is defined as the ratio of the number of turns in the primary to the number of turns in the secondary winding. It would be incorrect to conclude that the correct turns ratio is simply the ratio of the input voltage to the desired output voltage. Other considerations are considered in both conventional transformer designs and for the disclosed embodiments.

Generally, a slightly smaller turns ratio is chosen than the exact ratio suggested by the ratio of the input voltage to the desired output voltage. To see why this is done you need merely remember two facts: (1) The induced magnetizing current creates a back emf that almost matches the input voltage, but not exactly. The difference is precisely enough voltage difference to push that magnetizing current and any associated load current through the resistance of the primary winding. (2) The emf appearing across the secondary is not exactly the voltage that appears across the load. The full secondary emf is effectively applied to the secondary winding resistance in series with the load resistance. For a high resistance load almost all the secondary emf shows up across the load, but if the load resistance were to fall to where it equaled the secondary winding resistance, then only half of that emf would appear across the load. So, the "right" ratio of the number of turns in the primary to the number in the secondary is the nominal ratio times two fractions that are each a bit less than one. And in particular, as the load resistance is reduced (the load current is increased) the "right" ratio gets smaller and smaller as the load resistance decreases.

A very different, but closely related issue about the "nominal" ratio is what happens if the input voltage is not quite what it was supposed to be. If the input voltage is too large, then the right ratio would be increased by the ratio of the actual input voltage to the nominal input voltage, and conversely, if the input voltage were lower than expected, the turns ratio should be reduced by the ratio of that too-low input voltage to the nominal input voltage.

In conventional transformers, generally a turns ratio that is just slightly less than the nominal ratio is used. So, if the input voltage is what it is supposed to be, and if there is no load connected to the transformer to load it down, the output voltage will be slightly higher than it was supposed to be. And when there is a load connected, that will pull down the output voltage at least a bit. At some load the output will be precisely what it should be. For higher resistance loads the output will be a bit too big, and for lower resistance ones it will be a bit (or more than a bit) too small. So long as those deviations are acceptable, the transformer is said to work okay, and the load resistance value that forces the output voltage outside the acceptable range is the transformer design's "maximum load." (Well, a separate issue is the power that is dissipated in the transformer windings. At some level of output current this power loss will overheat the transformer, and that is another way of setting a maximum load capability for the transformer.)

So both to accommodate variable loads and to accommodate a variation in the input voltage, it would be nice if the transformer system had the option of not only changing the effective numbers of turns in both primary and (all of the) secondary windings synchronously at appropriate times within each cycle of the input voltage, it would be nice if it could choose each time the "right ratio" of effective numbers of turns for the then-current values of input voltage and load current, and taking into account the primary and secondary winding resistances in that new configuration. Such considerations are achieved by application of various disclosed embodiments of the transformer system. For a transformer with multiple secondary windings, the right ratio of the effective turns in the primary to that secondary's effective turns may differ for each secondary, as they may each have differing loads connected to them, as well as differing for each configuration (each set of numbers of turns for the primary and each of the secondary windings).

If all of the windings in the transformer are made of a series connected set of segments, then by choosing the number of sub-windings in each segment and the number of turns in those sub-windings appropriately, only a modest number of switches can suffice to give a large number of effective numbers of turns to that winding.

In FIG. 8A you see a schematic diagram of an exemplar disclosed embodiment that uses this approach. Here the primary winding 210 consists of three segments 250 wired in series, the first segment having only one sub-winding 230 bridged by a permanently connected snubber circuit 280, and the other two segments having two sub-windings 230 each. This means that one could potentially have up to four different effective number of turns for this primary winding.

The secondary winding consists of five series-connected segments 250, again each segment has two sub-windings 230. The essential switching circuit shown in FIG. 6B is here slightly modified to make it more compact horizontally. It shows up seven times in FIG. 8A (twice in the primary winding and five times in the secondary winding). This fundamental building block from FIG. 6B with its logic diagram FIG. 6C shows how three switches can choose one of two values (n or 2*n) for the segment's effective number of turns.

Calling a parallel connected segment a 0, and a series connected segment a 1, you can describe each possible configuration of the primary winding in FIG. 8A by a two-bit binary number and the configuration of the secondary winding by a five-bit binary number (one bit for each segment). There are 4 possible values for a two-bit binary number ($2^2$=4) and 32 possible values for a five-bit binary number ($2^5$=32). That means there can be 4 possible values for the effective number of turns in the primary winding 210 and 32 possible values for the effective number of turns in the secondary winding 220.

Using the logic diagram in FIG. 6C twice, shows how to set all six switches to achieve any of the desired one of four possible configurations for the primary winding in FIG. 8A. Using the logic diagram in FIG. 6C five times shows how to set all 15 switches to achieve any of the desired one of 32 possible configurations for the primary winding in FIG. 8A. Said differently, one seven-bit binary number specifies a particular one of the 128 total possible transformer system configurations (effective numbers of turns for both primary and secondary windings) for this embodiment design.

A winding all of whose segments had three sub-windings (N=3), can have its configuration specified by a ternary number [a number in base 3, having possible numeral values of 0, 1, or 2] with as many ternary number symbols as there are segments in that winding.

It is useful to make each successive pair of the possible configurations for either winding to have effective numbers of turns that differ from one another by equal amounts. Here is how that can be done.

In an example preferred implementation the first segment 250 of the primary winding 210 has a single sub-winding 230 with 160 turns. The two sub-windings 230 in the next segment each has 100 turns, and in the third segment 250 they each have 50 turns. This means that the minimum effective number of turns for the primary occurs when both of the switched segments connect their sub-windings in parallel and its value is 160+100+50=310 turns, and the maximum occurs when both of those segments put their sub-windings in series, and that value is 160+200+100=460 turns. The other possibilities are 360 and 410 turns, for four possibilities in all. So the step size in the primary configurations are equal to the smallest n value for any segment in that winding.

The secondary winding 220 has no unswitched segment 250 (like the first segment of the primary winding). It uses a similar series of stepped values for the turns in the sub-windings in each of its segments. Here the first segment has only 80 turns per sub-winding, the next has 40 turns, then 20 turns, then 10 turns, and finally 5 turns. This means there are 32 possible effective number of turns for this secondary winding, namely any multiple of 5 turns from a minimum of 155 turns to a maximum of 310 turns.

Shown at the right side of FIG. 8A is a circuit element 740, which is a current sensor. Ideally, the controller of this transformer system will have multiple sensors letting it know at each instant the input voltage, the output voltage across each load, the output current through each load, and also the temperature of the windings and the heat sinks on the electronic switches. The ratio of the output voltage across a load to the current flowing through that load is equal to the resistance of that load.

With all that information it would possible for the controller to choose the exactly right turns ratio for each new configuration, taking into account those external measurements plus the known resistances of the windings (adjusted for their temperature) in each configuration. In addition, it can compensate for any deviation in the input voltage from its expected value. Finally, it could disconnect any excessive load before the temperature of the windings got dangerously high.

The chart in FIG. 9 shows all the possible configurations for this example preferred implementation. At the top-right there are four boxes for the four possible configurations of the primary winding. Listed in those boxes are three numbers. The top number is the primary state. Below that is the effective number of turns in that winding in that state. And below that is the primary winding resistance in that state expressed in ohms. On the left side is a column of secondary winding state numbers. Just to the right of that are the corresponding effective numbers of turns in each of those states. And to the right of that are values of the secondary winding resistance in each of those states, again expressed in ohms. All of the listed winding resistances include the resistance of the switches 410 used to connect the sub-windings in that configuration.

Below the heavy bar across the top (under the descriptions of the four primary states), and to the right of the heavy vertical bar are the turns ratios for each of the 128 possible configurations of various embodiments of the disclosed transformer system.

Highlighted by a heavy rectangle on the charts in FIG. 9 are the configurations that give exactly a 2:1 turns ratio, which is the intended ratio of input to output voltage. Specifically, this example implementation approximately corresponds to a Hammond 172B step-down transformer which is designed to reduce a 230V input to a 115V output, with a rated 200V-A capability. The example implementation is built on an E-I core (using Tempel EI-150H laminations, with a stack height of 1.5 inches), which closely matches the core used in the Hammond transformer, with a locally built custom bobbin.

Notice that out of the 128 possible configurations there are ones with turns ratios all the way down to 1:1 up to very nearly 3:1. Thus the disclosed transformer system controller can almost always choose from this wide range of turns ratios one that is within less than 3% of the "right" value. That is true pretty much no matter what the load might be, and for a very wide range of input voltages. The reason for that 3% tolerance factor is simply that with 32 choices for the secondary, the turns ratio cannot be set more precisely than one part in 32 (which is about 3%). If the secondary had six sections that tolerance factor would drop in half.

More generally, for applications indicating a preference for more than 2:1 ratio between maximum and minimum effective number of turns in any winding, and where the "second method" is the chosen embodiment, more than two sub-windings per segment are needed. If you have N sub-windings in each of M series-connected segments, you'll have N choices for the effective number of turns in each segment. (For a segment whose sub-windings each have n turns, you can have n, 2*n, 3*n, . . . up to N*n turns.) And if you choose to make the number of turns per sub-winding in the successive segments equal to some starting constant, K, times a non-negative integer (0, 1, 2, 3, . . . M–1) power of N, then you'll end up with the $N^M$ possible values for the effective number of turns in that overall winding, ranging from $K*(N^M-1)$ $K*N*(N^M-1)$ to turns in steps of K turns.

So for implementations with four segments, each with three sub-windings you could get 81 possible values for the effective number of turns (from K*40 to K*120 turns in steps of K turns). And the resistance of the winding will go from a minimum value to a maximum that is nine times the minimum value. (The max/min resistance ratio will always be $N^2$.) In that case the "right ratio" can be set to within about 1% with only four segments, rather than the six required to get nearly that precise with N=2.

It takes more switches per segment to configure more sub-windings in parallel, in series, and in one or more series-parallel configurations to give each of the N possible effective number of turns for that segment. For N=2, it takes 3 switches. For N=3 it takes 7 switches. For N=4 it takes 11 switches. In general, the larger N, the more switches you'll need. But using a larger N also allows you to get a larger ratio of maximum to minimum effective turns and, even more impressive, an even larger ratio of maximum to minimum winding resistance.

Fortunately, since this strategy makes maximum use of the "winding window," in the example implementation using only segments with an N of 2 (which yields a two-to-one maximum ratio of effective number of turns and a four-to-one maximum ratio of winding resistances) it suffices to show a very considerable benefit in terms of power savings, and with enough segments, any desired accuracy in output voltage can be achieved. Of course, one must add to the winding resistance, the resistance in the switches, which are themselves not perfect, but in most cases the switch resistance can be made much smaller than the winding resistances, even for the shortest sub-windings.

For example, the ratio of maximum to minimum winding resistance shown in FIG. 9 for the secondary is almost 4:1. The small deviation represents the switch resistances which change very little, if at all from one extreme configuration to the other. The primary resistance values shown not only include the switch resistances, they also include the resistance of the 160 turn unswitched segment, and thus the primary resistance doesn't show nearly as wide a range of values.

For various embodiments, the choice of switches is a design consideration.

The basic technology of building a transformer is by now a very mature technology. Many improvements have been made of the past century and more, especially in making better core materials. But progress on these fronts is now fairly slow.

For various embodiments of the disclosed transformer system, conventional transformer technology is utilized along with modern switch technology. These requirements also require the use of what are termed "single-pole, single-throw" (SPST) switches and ones that can switch very rapidly. FIG. 6A shows a simple schematic drawing of such a switch 402, shown enclosed in a rectangle. In the figures, each such switch is identified by a reference number in the 400 sequence. In the logic diagrams the reference number of the switch is replaced by indication of the state of the switch (ON or OFF). The triple-bar "equal signs" are an indication that all three versions refer to exactly the same thing, namely a switch that is either open or closed.

Shown in FIG. 7 are switches numbered from 403 to 408 standing for all the many switches one might use to get a large number of configuration choices according to Method One. In FIG. 8A the switches connected to the primary winding are numbered from 420 to 425 and for those connected to the secondary winding the numbers go from 426 to 440.

Electrical switches have been around a very long time, but super-fast switches have not. For various embodiments, design considerations indicate the use of a "bi-polar switch" that can stand off a very large voltage (at least some hundreds of volts) when it is in the OFF state, and with a very low resistance (less than one-tenth of an ohm) between its terminals when it is in the ON state. And the switch must be able to switch between its ON and OFF states in a very short time. The bi-polar part of the requirement means that the switch shouldn't care if one end of the switch is connected to a voltage that is higher or lower than whatever is connected to the other end if it is in the OFF state, and it should be able to carry current in either direction equally easily if it is in the ON state.

Given current switch technology, a suitable choice under the design considerations for embodiments of the disclosed transformer system is to use a pair of N-channel enhancement-mode superjunction MOSFET transistors back to back.

Figure 10:
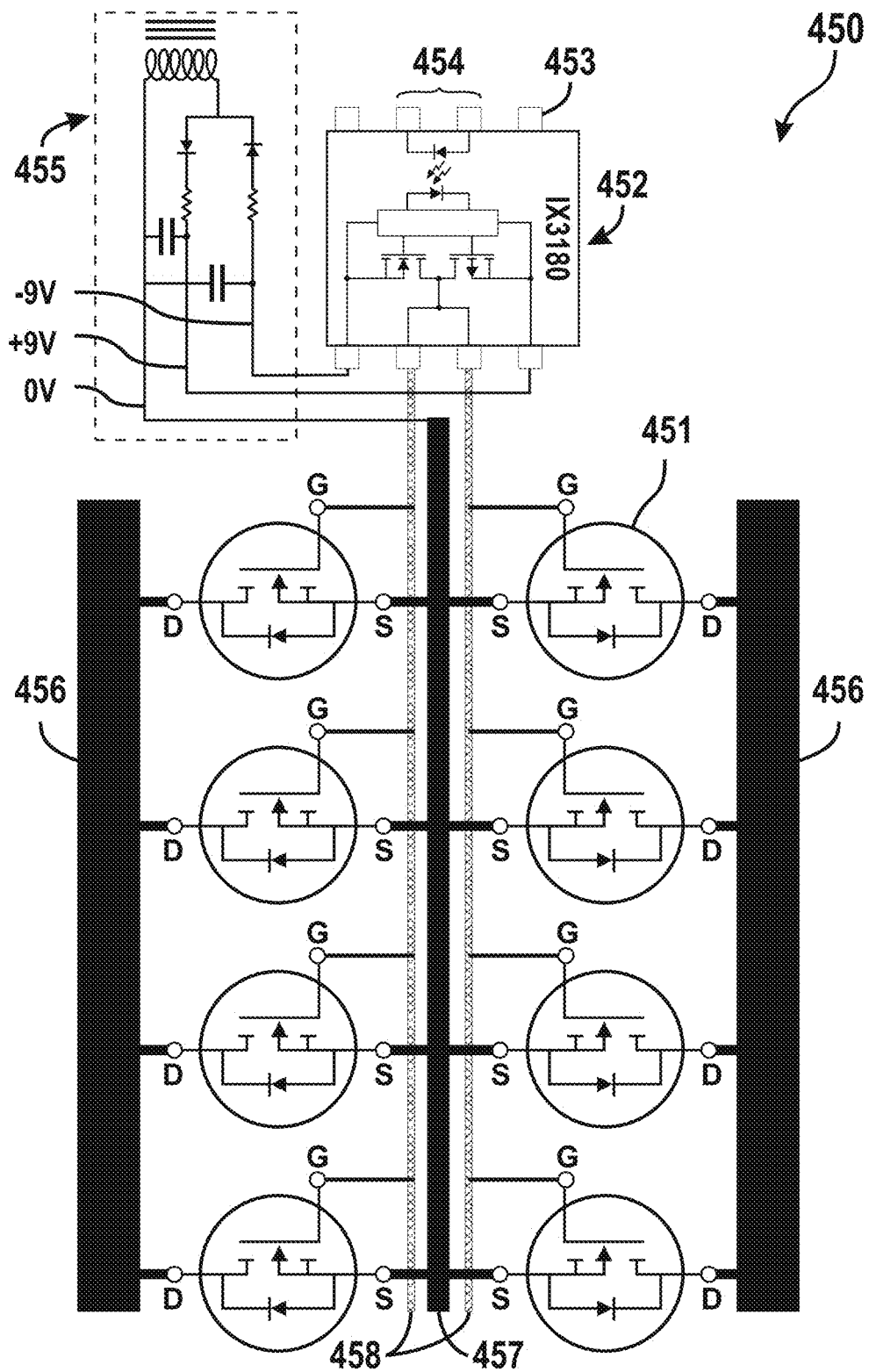
FIG. 10 is a schematic diagram of one possible implementation of a suitable electronic SPST switch.

FIG. 10 shows a schematic diagram of one such switch 450, including its needed associated circuitry. The particular superjunction MOSFET power transistor 451 indicated in FIG. 10 is a D3S080N65 made by D3 Semiconductors. It has three terminals, labeled S (for source), G (for gate), and D (for drain). It is capable of standing off at least 650 volts, has an ON-resistance of only 0.08 ohms (80 milliohms), can carry up to 30 amps (as long as it is adequately cooled), and can switch in well under 100 nS (100 nano-seconds, or one-tenth of a millionth of a second).

When the voltage on the drain terminal is more positive than that on the source, and if the gate voltage is equal to or lower than the source voltage, this MOSFET is OFF. When the gate voltage is more than a few volts above the source voltage, the MOSFET is ON and the source and drain are connected by what amounts to a very small resistor (the aforementioned 80 milliohms). But if the drain voltage is lower than the source, then when it is OFF this transistor just acts like a forward-biased diode. That is, it will carry almost any amount of current no matter what the gate-source voltage so long as the source to drain voltage is at least most of volt. Of course, if it is ON, it can carry up to perhaps 8 or 9 amps before that diode would get substantially forward biased. Beyond that current the voltage drop across it might be even less than its normal very low ON-resistance would suggest.

Constructing a bi-polar switch out of a pair of the above described transistors relies on the design factor that as long as they are OFF and are wired as in FIG. 10, then one of them will act like a forward biased diode, but the other one will block any current flow (so long as the voltage across the pair is less than 650V) so the reverse-biased MOSFET (which is acting like a forward-biased diode) won't, in fact, have to carry any significant current. If the gates of both transistors are more positive than their sources, both transistors will be ON and they will lock the two drain terminals together with only 0.16 ohms resistance between them. (At 30 amps this would produce a voltage drop of about five volts, which presents no problems to the transistors, other than warming them if it continues and if there isn't adequate heat-sinking for the transistors. Putting several of these transistor pairs in parallel is permissible and can lower that effective ON-resistance substantially.)

While just one pair of MOSFETs will work quite well for a switch that isn't ever carrying a huge current, what is shown here in FIG. 10 are four MOSFET pairs in parallel to produce an ON resistance of only 40 milliohms, and thus makes this switch capable of carrying four times as much current as the single pair could. (This is a schematic diagram, and not a suggested board layout. Careful attention must be paid in the board layout to minimize inductance from the gate driver to the power MOSFETs, and to equalize the arrival time of the gate drive signals.) All of the source terminals are tied together by the large black bus bar 457 in the middle of this diagram, as are all of the gate terminals in each of the top and bottom groups by the two narrower cross-hatched bus bars 458 in this diagram. All of the drain terminals at the top are tied together (and those transistors are, in fact, bolted to a common heat sink that also serves as one of the terminals 456 of the switch). All of the drain terminals at the bottom are similarly bolted to a common heat sink that serves as the other terminal 456 of the switch. The gate bus bars 458 are connected to the gate driver chip 452. The source bus bar 457 is connected to the zero-volt terminal of the floating power supply 455.

It is relevant to consider that when the switch is OFF, the source terminal voltage will always be a little less than one volt more positive than the more negative of the two drain terminals. And with AC voltage applied to the transformer this means the voltages on the source terminals of the various switches will be bouncing all over the place. For example, if one side of a switch were tied to ground (zero volts) and the other to the input voltage which, for a 230 Vrms input will range from plus 325V to minus 325V, the source terminal would spend half of each cycle at about 1V above ground and the other half cycle riding the input voltage down almost to negative 325V.

This means that the drive circuit 452 (here shown as an IX3180 integrated gate driver circuit) must be powered by a floating power supply 455. (The IX3180 has an internal optocoupler, so its drive signal, which is supplied through the two terminals 453 indicated on that chip, can come from a source that is just a few volts away from ground, no matter what the voltage of the gate driver's power supply 455. The label 453 indicates where pin 1 is on chip 452.) Shown in this diagram is just the output portion of this floating power supply 455. It starts with an oscillator (not shown here) that creates an approximately 9 volt square wave at about 100 kHz that drives the primary of a pulse transformer with four secondary windings (all with a 1:1 turns ratio to the primary). The output of one of those secondary windings (shown here) is full-wave rectified to give a plus and minus 9V power supply for the gate driver chip. Each of the other pulse transformer secondary windings powers a different switch 450 in the switching network 400 (see FIG. 4).

The progress in superjunction MOSFET technology in ongoing. The one described above is based on silicon technology. Others use GaAs or SiC and there are now some capable of standing off more than 1200 volts and with on-resistances as low as 30 milliohms. Plus there are some very interesting wholly mechanical switches in development that may someday be even better. In various embodiments of the disclosed transformer system, advancing technology may be used to lower the cost and improve the performance of the system.

Aspects of programming the transformer system controller are considered here. The controller's job is to pick the right configurations for each portion of each cycle of the input voltage, and in addition to choose when to change from one configuration to another within each quarter cycle of the input voltage.

The goal of the controller program is to maximize the transformer systems performance. One design consideration is the priority given to maintaining the output voltage for each load as nearly perfect as possible, versus minimizing the power dissipation in the transformer. In the data presented below, the highest priority was assigned to maintaining a constant output voltage, and a secondary priority is assigned to minimizing power dissipation.

In order to accomplish the goal, and to get the full range of potential benefits of the transformer system herein disclosed, the controller must have a fairly full awareness of the systems' context all of the time. That can be done by adding a number of sensors to the components shown in FIG. 4.

Figure 11:
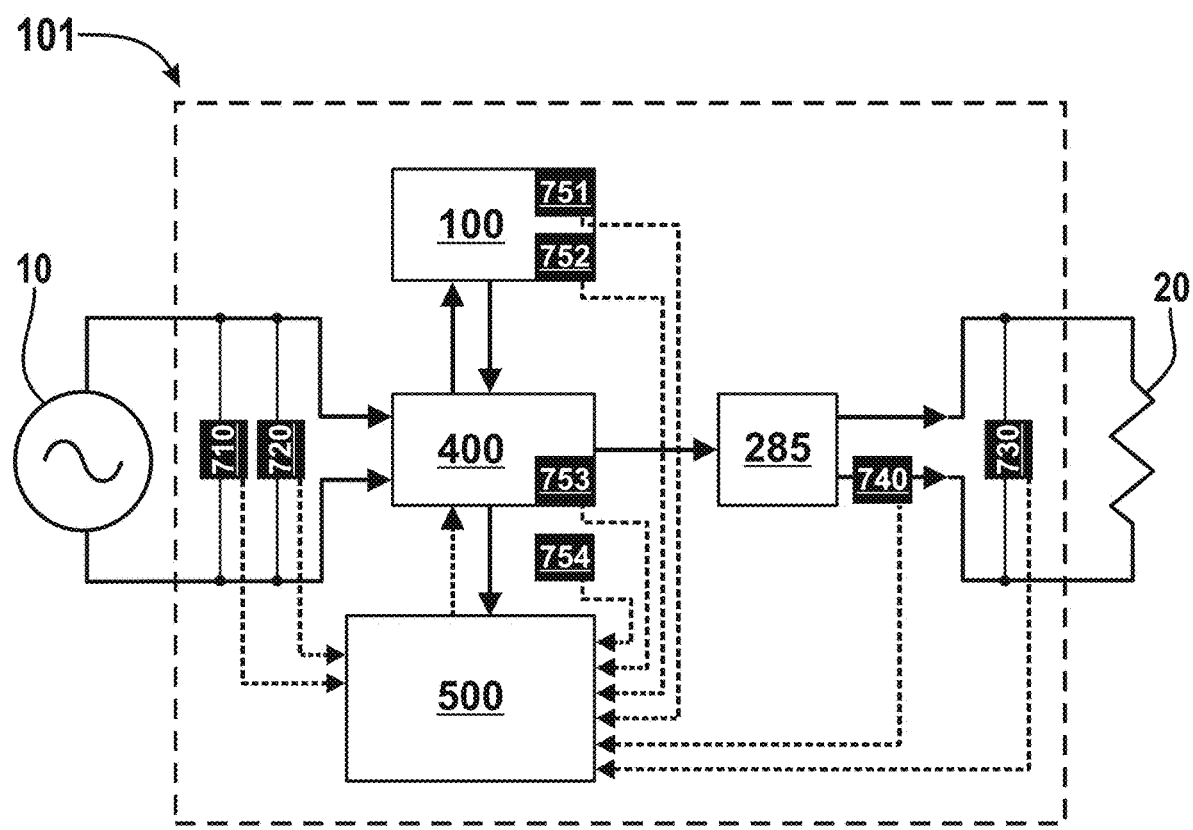
FIG. 11 shows the block diagram from FIG. 4 with various sensors added. The flow of power from source to load is distinguished here from the flow of information from the sensors to the controller and from the controller to the switching network.

FIG. 11 is a redrawing of FIG. 4 with slight modifications and with the addition of eight sensors 7xx. As in FIG. 4, the heavy solid lines with arrowheads on them indicate how power flows from the source 10 through the switching network 400 to the controller 500 (to give it the power it needs to function), but mainly to and from the sub-windings of the transformer 100 and then on to the load 20.

The heavy dashed lines with arrowheads show the flow of information from the eight sensors to the controller, as well as the information coming from the controller to activate the switching network.

The two sensors 710 and 720 that are connected across the input voltage perform two distinct functions, both of which the controller needs to do its job. The sensor 710 is called a zero crossing detector. It puts out a narrow pulse each time the input voltage changes from positive to negative. These points in time mark the beginning of each half-cycle of that input AC voltage. The time interval between them indicates the frequency of the power line. The sensor 720, on the other hand, simply reports the magnitude of the incoming voltage at frequent intervals. This give the controller the ability to monitor the root-mean-square (rms) value of the input voltage and observe any major distortions in the input waveform.

The sensor 730 connected across the load monitors the output voltage across each load (the actual delivered output, as opposed to the secondary emf), also at frequent intervals. Its output is used by the controller in conjunction with the output of sensor 740 which monitors the output current at those same frequent intervals. The ratio of these two outputs gives the effective load resistance.

The sensors 751 through 754 give the controller information on how much the various parts of the transformer system are heating up. In the exemplar embodiment 751 monitors the heating of the magnetic core, either from power losses in the core (including eddy current losses), or from heat traveling into the core from outside (mostly from the windings surrounding it). The sensor 752 (or this could be several different sensors buried at different depths from one another in the windings) monitors the winding temperatures to alert the controller whenever a winding gets dangerously hot.

The sensor (or collection of sensors) 753 monitors the temperature of the switch heat sinks in the switching network 400. Generally, electronic switches can withstand far higher temperatures than a transformer's windings, but still even they have limits that must be respected.

The last of the temperature sensors 754, reports the ambient temperature. If this transformer system is housed in an unventilated cabinet, the air surrounding it may get warm enough to endanger the controller, perhaps before it causes serious damage to the windings or the switches.

Figure 12:
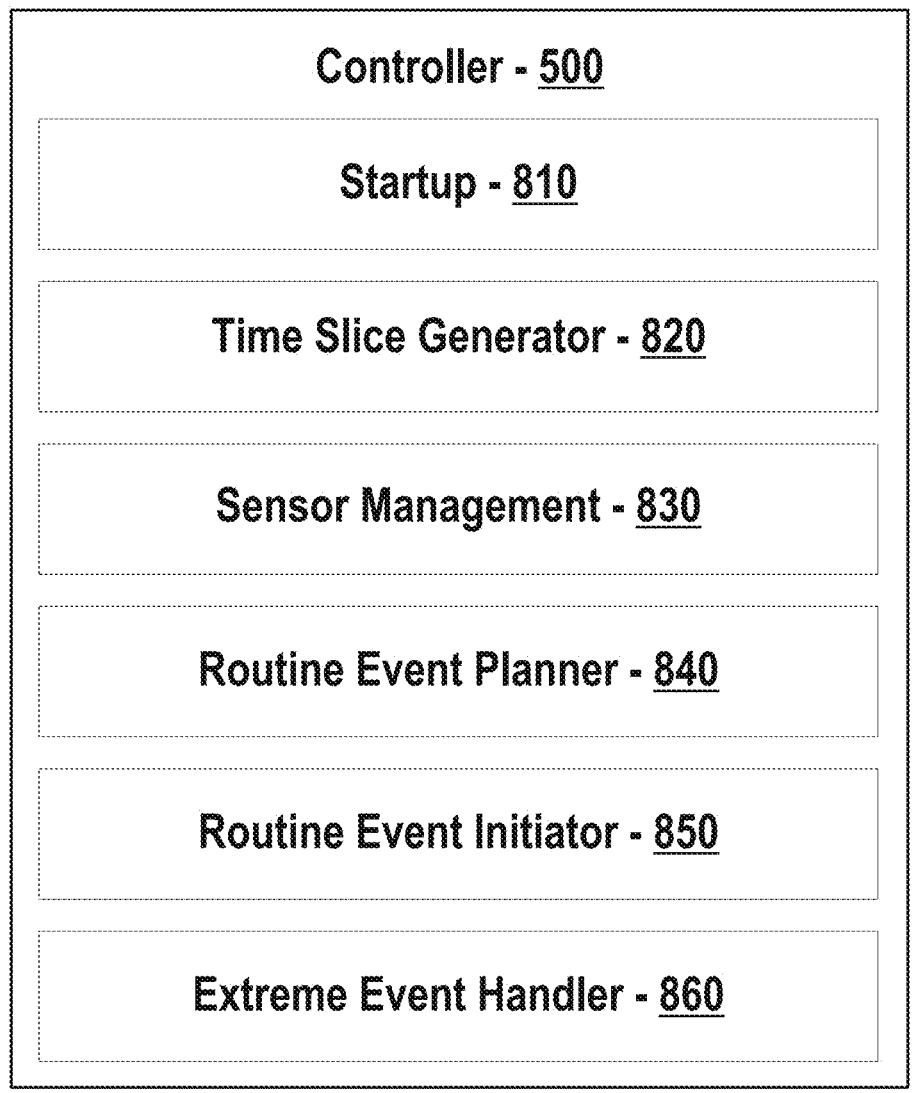
FIG. 12 shows the various program functions recommended for embodiment in the controller 500 programming.

FIG. 12 lists a number of different tasks that the controller 500 must do in order to let the transformer system perform as expected and deliver the benefits it offers. This isn't the only way to organize its operations but explaining this way will illuminate the tasks it must do and show at least one way they might well be done.

When the controller first receives power (when it "wakes up"), it must first make sure every part of the system is functioning and set up any necessary internal tables, etc. This is the task of the Startup program 810. One of the first things it will do is start the most critical of the other tasks, in particular the Time Slice Generator 820, the Sensor Manager 830, and the Extreme Event Handler 860.

The Time Slice Generator 820 uses the pulses from the zero-crossing sensor, 710. It first measures the time interval between two such zero-crossing events, and from them infers the power line frequency (or at least an estimate of what it is right then), and it starts a software oscillator that generates some set number of cycles within each half-cycle of the input voltage. At the end of each cycle, if this counter doesn't produce exactly the target number of cycles, the time difference is used to adjust the frequency of that time slice clock. One name for this sort of oscillator that adjusts itself is a "phase-locked loop" and it is what lets the controller know when the input voltage (and thus the load currents) are at their highest or lowest values and thus when to use configurations that minimize or maximize the effective number of turns in the primary and secondary windings.

The job of the Sensor Manager 830 is, as its name suggests, to monitor the health of the sensors and to store, perhaps average, or otherwise manipulate the sensor outputs to give the controller's other program modules the information they need in a timely manner.

Once the Time Slice Generator 820 has set up its time slice clock, and once it knows the input frequency is at least fairly stable, the Routine Event Planner 840 can begin its work. During one half cycle of the input voltage, this program figures out the effective load resistance, checks out how much the input and output voltages may differ from what they should be, and from this information (plus the temperature-adjusted resistances of the primary and secondary windings) figures out for what percentage of the cycle it needs to use the lower effective turns configurations and what the ideal turns ratio is for each such configuration it intends to use.

It can first consult a table listing ranges of output load and decide which range the current load fits into. (If there are multiple loads on different secondary windings, the controller must pick which load to prioritize when choosing at what times within the cycle to switch configurations, but it still can choose the exactly best turns ratio for each load independently.)

The table will for each range of loads indicate how much of the cycle to spend in each of the possible primary winding configurations and then the controller can compute the ideal turns ratio for each of those configurations and for each load. This ratio must then be further adjusted if the input voltage is significantly different from the expected value. (That adjustment is simply multiplying the optimum turns ratio as previously determined by the actual input voltage divided by the expected input voltage.) Then the controller must pick from the table of available turns ratios which one(s) best fit each different primary configuration and the current load on each secondary.

By the end of that half-cycle, this program will deliver a plan of action to the next module, the Routine Event Initiator 850.

The Routine Event Initiator 850 takes the plan that was just figured out during the last half cycle and during the present cycle and makes sure it gets implemented. This means it loads a table of time slice numbers at which it should change configurations and what configurations it should go to at each one.

When such a time arrives, the Routine Event Initiator will first command all of the switches in the Switching Network 400 to turn OFF. It next will load into the Switching Network the new configuration it shall implement, but not let it do so until after a suitable time delay has elapsed. Once that time (typically 100 nS to 200 nS—a tenth to a fifth of a microsecond) has passed, the Routine Event Initiator will tell the Switching Network to activate the switches according to the new configuration.

Since any configuration can be described by a single number (in the exemplar embodiment, that number is a seven-bit binary number), that is all the information the switching network must be told. It is up to that network to know how to convert each bit of that number into (for N=2 segments) three switch commands to put that segment into its proper parallel or series configuration.

One reason for dividing up the work this way is so that the events that take quite a bit of the half-cycle to complete, but whose outcome isn't necessarily useful immediately, can be interrupted by any more time-critical action.

Because of the urgency of doing the configuration switching events at precisely the right times, the Routine Event Initiator's actions will be able to interrupt anything any other routine may be doing, and those routines (e.g., the Routine Event Planner) can wait until the Initiator's action is complete before resuming whatever it was doing when it got interrupted. But sometimes there is something more important that must be dealt with even more urgently.

If the Sensor Manager 830 receives a dangerously high input voltage report, it must interrupt whatever else is going on and let the Extreme Event Handler 860 take over. This also must happen if the output current on any secondary winding rises to a dangerous level, or if the winding (or any other) temperature in the system gets too high.

The Extreme Event Handler, once invoked, takes complete control of the system. If the event is extremely high input voltage, it will command the Switching Network to OPEN all of it switches, in order to protect them and the loads from a high voltage surge. (Naturally, there should be a good surge arrestor preceding this transformer system as well. For a system that normally runs on 230V(rms) AC, the peak input voltage should be about 340 volts. A surge arrestor might be able to keep the input from exceeding 600 volts. But the Extreme Event Handler will switch off all the switches well before then, perhaps any time the input voltage is greater than 500V.

If the Extreme event is a gross overload current on just one of several secondary windings, the Extreme Event Handler might simply shut off the output to that winding's load, while keeping all the rest of the transformer system operating normally.

If the event was a dangerously high input voltage, the Extreme Event Handler can be programmed to wait until the input voltage sensor 710 reports that the input voltage is now down into a safe range (perhaps less than 450V, which would be seriously high, but nothing the transformer system couldn't compensate for by choosing a different turns ratio), and then relinquish control and let the transformer system go back to its normal operation. Alternatively, it might wait for some specified time to be sure the surge event is well and truly over before turning things back on.

Similarly, if there is an output current overload so extreme that the transformer must shed that load, the question arises whether and how soon that load should be reconnected. If it appeared to be a true short circuit kind of event, probably the best response would be to keep that secondary output shut down until someone manually presses a reset button to signal that the short circuit has been removed.

Given the above identified inputs, various embodiments for programming the controller may be implemented. One embodiment of the system controller programming begins by dividing up the time of one cycle of the input voltage into a large number of steps. Next is the creation of a phase-locked loop that is synchronized to the input voltage. This divides up the cycle into the desired number of time slices and keeps track of which of those steps includes the present time.

Then, once the controller knows the things listed above, it can first consult a table (as explained above) listing ranges of output load and decide which range the current load fits into. (If there are multiple loads on different secondary windings, the controller must pick which load to prioritize when choosing at what times within the cycle to switch configurations, but it still can choose the exactly best turns ratio for each load independently.) The table will list how much of the cycle to spend in each of the possible primary winding configurations and then the controller can compute the ideal turns ratio for each of those configurations and for each load. This ratio must then be further adjusted if the input voltage is significantly different from the expected value. (That adjustment is simply multiplying the optimum turns ratio as previously determined by the actual input voltage divided by the expected input voltage.) Then the controller than must pick from the table of available turns ratios which one(s) which best fit each different primary configuration and the current load on each secondary.

Then the controller watches the time slices of the cycle as they go by and, based on that and the decisions made as described above, it chooses when to switch the configurations of all the windings simultaneously.

Benefits of the disclosed transformer system are notable. The three most commonly cited measures of a transformer's performance are its power efficiency [the percentage of the power taken from the source that makes it to the load], regulation [the percentage change in the output voltage going from no load to the maximum rated load], and idle current [the current, or more to the point, the amount of power that the transformer consumes when it is connected to the source but has not load connected to its output(s)].

The example implementation of the disclosed transformer system was based on a core size that is normally described as a 200V-A capable transformer. That is, its design maximum "normal" load would be no less than about 66 ohms, which at 115 volts would dissipate 200 watts.

The performance of the transformer system doesn't differ a whole lot from any conventional transformer intended for that size load until it is overloaded—it will dissipate a bit less power, but otherwise it may seem unimpressive. However, under a heavy overload condition the difference becomes stark. Keep in mind, when studying the graphs in FIG. 13A, FIG. 13B, and FIG. 13C that most of each of the curves fall way outside the nominal normal operating range. At 115V nominal output, the nominal maximum output current is only 1.74 amperes. (Since 115V is the ideal output, that number is boldfaced on the scale at the left, and the graph line for that value is heavier than the other lines.)

Figure 13A:
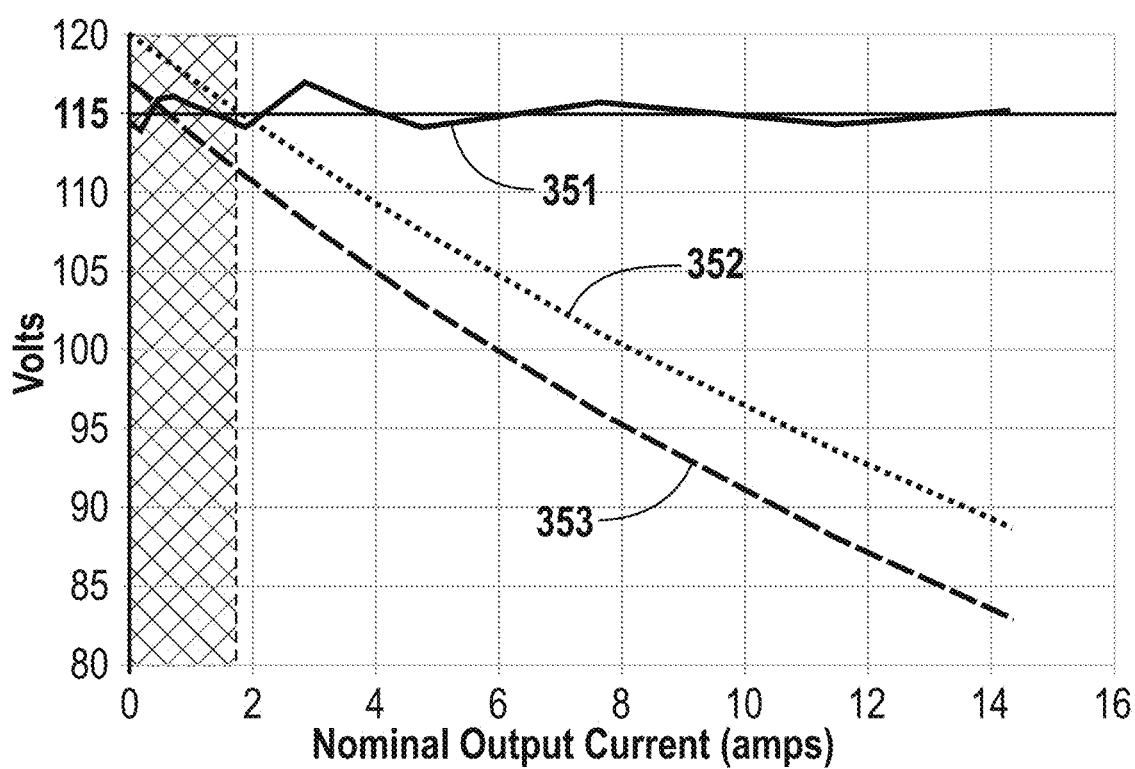
FIG. 13A is a graph comparing the output voltage under heavy load conditions for two conventional transformers and an example of a preferred implementation according to the present invention.
Figure 13B:
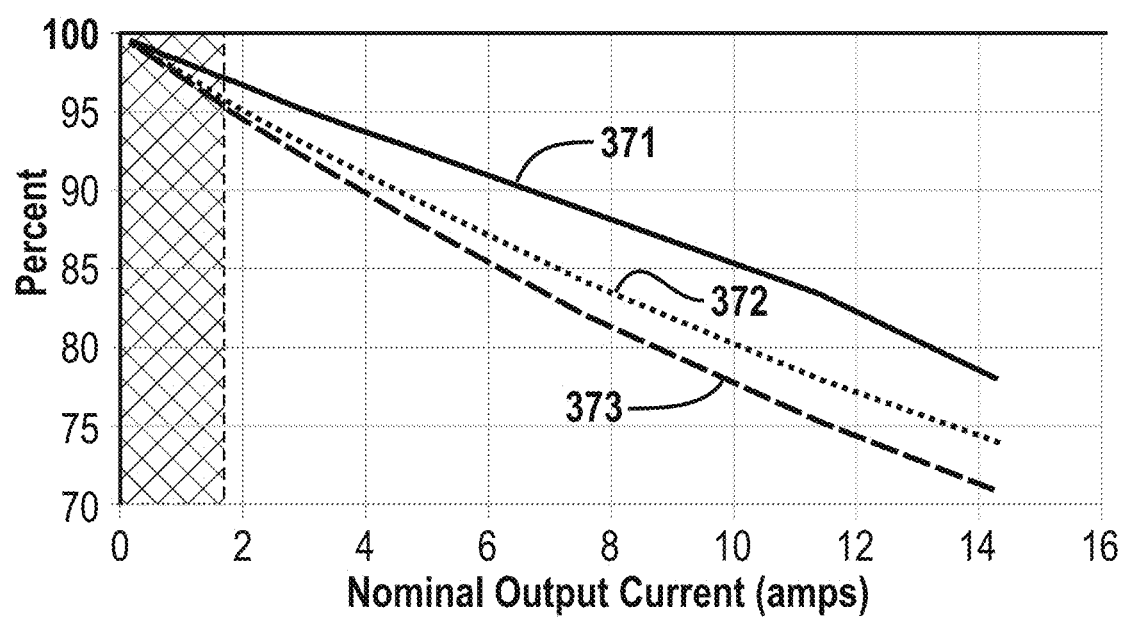
FIG. 13B is a graph comparing the power efficiency under heavy load conditions for two conventional transformers and an exemplar embodiment implementation.
Figure 13C:
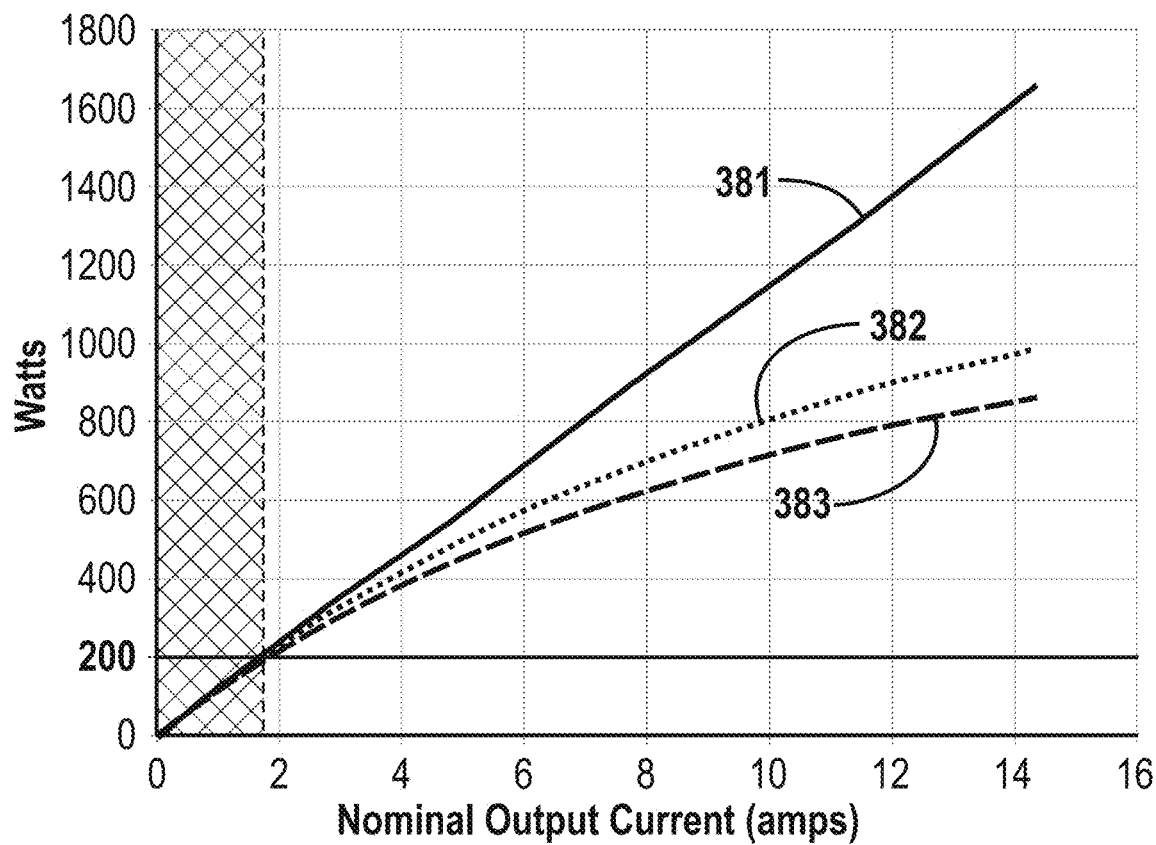
FIG. 13C is a graph comparing the amount of power delivered under heavy load conditions for two conventional transformers and an exemplar embodiment implementation.

On the graphs in FIG. 13A, FIG. 13B, and FIG. 13C this range of output current is indicated by the rectangle with a dashed outline and cross-hatching inside. All of the curves to the right of these rectangles represent the response to heavy to super-heavy overloads (up to nearly seven times the normal maximum load).

In FIG. 13A you can see how a comparison of the output voltage under heavy overload of two different conventional transformers versus how this example preferred implementation of the present invention fares. The voltage across the load ideally would be 115 Vrms (indicated by the boldface 115 on the scale at the left).

The first conventional transformer (indicated in FIG. 13A by the line 352) is one designed with an aggressively small number of primary turns (in hopes that its reduced primary winding resistance will let it handle larger current overloads more gracefully than would otherwise be the case). In this instance the primary winding has 410 turns and the secondary has 215 turns (for a ratio of only 1.907). You can see that at no load it puts out well more voltage than it should, and under heavy load its output voltage falls fairly far. Its idle power is about 35 mW. (These curves are all shown for a 60 Hz input voltage. This transformer will work with a 50 Hz source, but its idle power dissipation for that input source is nearly 3.5 watts—likely more than most customers would accept.)

The second conventional transformer (indicated in FIG. 13A by the line 353) uses 460 turns on the primary winding and 325 on the secondary (for a ratio of 1.957). Since that is closer to 2:1, the no-load output voltage is elevated only slightly above 115V. And its idle power is only 7 mW (at 60 Hz; or 17 mW at 50 Hz). Again under load its output voltage falls, in this case even farther than for the first conventional transformer.

Neither of these is identical to the Hammond transformer mentioned above, but the behavior of each of them is quite similar to that of the Hammond unit.

This example transformer system in accordance with the present invention (using the circuit shown in FIG. 8A) has an effective number of primary turns that can be switched to any of four values between 310 and 460, and an effective number of secondary turns that can be switched to any of 32 values between 155 and 310. The line representing its performance (indicated in FIG. 13A by the line 351) resulted from choosing the "best" configuration for an infinite resistance load and for each of a dozen other load resistance values (from 600 ohms to 8 ohms in a roughly logarithmic sequence). The optimization goal expressed by this graph's data is to use configurations that produce as close to 100% of the nominal output voltage as possible, and then to maximize the power efficiency. In this graph you see the output voltage performance; in FIG. 13B and FIG. 13C you can see the power performance of these approximately optimized configuration choices.

(These are only approximately optimized results, as the parameter space is large and finding the true optimum configurations is not easy. The actual optimum values may be even better than what is shown here, but at least this performance can be obtained.)

This graph shows that at low load currents, when the turns ratio is very nearly 2:1, the only configurations available will have a fairly low effective numbers of secondary turns, so the minimum step of five turns in that effective number of turns represents about 3% of the total number. This means that even a jump from one configuration to the next available one will produce about a 3% change in the output voltage. But when the load current gets much larger, in order to get the nominal output voltage, one needs to use a much smaller turns ratio, implying the use of many more secondary turns, and there the minimum step of five turns makes a much smaller jump in the output voltage. (If the lack of perfection in output voltage at this level is a concern, one need only increase the number of segments in the secondary or increase the number of sub-windings per segment.)

FIG. 13B shows the power efficiency of each of these three transformers. (Here the goal is 100%, again shown by the boldface number of the left-hand scale and heavy line across the top of the graph.) Notice that even while boosting the output voltage all the way up to the nominal value, despite a super heavy overload output current, the example preferred implementation transformer system (indicated in FIG. 13B by the line 371) still consumes about 20% to 30% less of the power it draws from the source than either of the other conventional transformer designs (indicated in FIG. 13B by the lines 372 and 373). (That is, the difference between the actual power efficiency and 100% is reduced by 20% to 30% for the transformer system from what it is for either of the conventional transformers.)

FIG. 13C shows how much power each of these transformers can deliver to the same load resistance, versus the value of that load resistance. (Here the boldface 200 on the scale at the left side and the heavier graph line at that level represents the maximum load these transformers would normally be asked to deliver.) Since the conventional transformers' output voltage drops substantially under the heavy loads represented by the larger output current values, they fail to provide anything close to the nominal power to those lowest load resistance values (indicated in FIG. 13C by the lines 382 and 383), whereas the example preferred implementation transformer system (indicated in FIG. 13C by the line 381) does essentially exactly what one would want it to do. For the 10 ohm load this transformer system delivers over 60% more power.

If the overload comes from a large motor that takes an enormous surge current while it is starting up, a transformer system according to the present invention will get that motor started far quicker than a conventional transformer. This means the excessive power dissipation that such large currents cause will last for a much shorter time, resulting in very much less heating of the transformer.

These graphs certainly show load currents and resulting power dissipations in the transformer that go far beyond what any of them could reasonably support in a steady state. But if the surge overload is limited to only a few seconds, the thermal mass of the transformer means that it can absorb that additional energy without necessarily overheating.

Furthermore, if the transformer system has several secondary windings supplying different loads (different customers, for example), then when this sort of surge load happens, the other users of power from this transformer system will be totally unaware of that fact—unlike with the conventional transformer where those other customers would see their lights dim, or perhaps have their computers reset themselves, etc. And if instead of a motor starting up, the overload was occasioned by an actual short circuit across that secondary, with the output current and winding temperature sensing capabilities in the transformer system, its controller can simply disconnect the one secondary winding with the short circuit load and keep on supplying the other customers through its other secondary windings as usual. With a conventional transformer, such a short circuit might simply cause a circuit breaker upstream from the transformer to open up—thus shutting off power to all those downstream customers, or as often happens, the transformer might heat up so much it would explode.

Conventional electric power transformers come in many power ratings. Generally, the larger the core, the more power the transformer can handle. The manufacturer gives each transformer a maximum volt-amp rating (equivalent to the output power it can deliver to purely resistive load). They base this rating on two things: (1) How much power it can deliver without getting too hot (risking burning up), and (2) how much it can deliver before the output voltage is dragged down too far. And generally, the larger the power rating, the higher the idle power dissipation.

Usually a transformer for a given application is chosen to be able to support the maximum more-or-less steady load it will be asked to support. But often the loads are anything but constant. Most of the devices getting power from the transformer may draw a pretty steady amount of power, but some (in particular, a large motor or compressor on, for example, an air conditioning unit) may operate only sporadically, and whenever it starts up it draws an enormous current, albeit only briefly.

If the transformer supplying that machine is barely able to keep up with its normal load, then during these surge load situations the voltage it delivers will fall quite noticeably. That can be annoying, or in some cases it can be far worse than that. If the dip in voltage is severe enough, computers powered by that transformer can either turn themselves off, or reboot—in either case causing any work one might have done to be lost. If there is some critical life-support equipment being powered, and if it fails to do its job because of the voltage dip, the result could be tragic.

Normally, if there is any suspicion this sort of problem might arise, the only solution available is to choose a transformer with a larger power rating—even though that means it will be larger, heavier, and more costly, and most of the time it will be working far below its nominal rating.

In various embodiments of the disclosed transformer system it is possible to support even huge surge loads without any noticeable dip in output voltage. Further, if the transformer has multiple secondary windings, it can keep the output voltage on each one at or very close to its nominal value even as the loads may differ drastically from one to another.

Embodiments of the disclosed system that include transformer temperature sensors as well as the output voltage and current sensors, are capable of detecting any time the surge load has gone on so long that the transformer is in danger of overheating, and are capable in such a case of simply turning off that secondary output.

Finally, if the input to this transformer system comes from some conventional transformer upstream that is itself experiencing a severe overload, and as a consequence has a significant output voltage dip, this transformer system can compensate for that on the fly, keeping all of its outputs at or near their nominal values. Then as that under-value input voltage moment ends, if the input voltage overshoots to become an over-voltage input, the transformer system can still keep all its output at their nominal values. And if the input voltage source should, for any reason, experience an unacceptably huge spike in the input voltage, this transformer system could simply disconnect itself from the source for the duration of the spike. All of these adjustments can be made on a cycle-by-cycle basis. Far faster than other "automatic voltage stabilizer" systems.

All of these benefits mean that one can buy only just enough transformer power capacity, very possibly saving on the purchase price, and certainly saving in power savings and greater satisfaction over time, not to mention being able to fit the now smaller transformer system into a tighter space and saving on its weight. In many applications (e.g., cars and airplanes), the weight and size savings may be even more important than any cost savings!

In addition to the sorts of transformer discussed in detail above, it may be worth pointing out that some other kinds of transformer can likely see similar benefits from this approach. Three phase transformers clearly are so similar that enabling this sort of manipulation of the effective numbers of turns in all of their primary and secondary windings, with the changes in each primary winding being made synchronously with the changes in its secondary winding(s) would be beneficial. Since each phase has its voltage (and therefore its load currents) peak at a different time during one cycle of the line, there will be a different set of switching times for each phase.

Another sort of unusual transformer that may well benefit from this approach is one in which the magnetic core is made in two parts with a small gap between them so that one part can move (e.g., rotate) past the other part yet all the while maintaining the same magnetic flux through both the primary and secondary windings. The only additional steps one would need to apply this approach in that situation would be to have two controllers. One controller 500 switches the primary winding configuration and, at the same time, the other controller switches the secondary winding configuration. Each controller will have direct access to only some of the necessary information, and they will have to be kept in sync with one another. So there would have to be some wireless communications link between the two controllers, so each would "know" all the sensor data that was received by the other controller, and so they could coordinate their actions to achieve the necessary sub-microsecond simultaneous switching. The primary controller might be the master controller and the other controller a slave unit.

In the Summary and in the Description above, and in the Claims below, and in the accompanying drawings, reference is made to particular features of the invention. It is to be understood that the disclosure of the invention in this specification includes all possible combinations of such particular features. For example, where a particular feature is disclosed in the context of a particular embodiment of the invention, or a particular claim, that feature can also be used to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

What has been described herein is considered merely illustrative of the principles of this invention. Accordingly, it is well within the purview of one skilled in the art to provide other and different embodiments within the spirit and scope of the invention.

LIST OF REFERENCE ITEMS

10 Source of input voltage
20 Load Resistance
100 Transformer (core, windings, and connection points)
101 Transformer system (including switching network, controller, required snubber, & sensors)
110 Magnetic core
111 Core I-lamination
112 Core U-lamination
113 lamination stack
114 Core E-lamination
115 bobbin end flange
116 outermost layer of windings on the bobbin
117 cross-section of bobbin tube
120 magnetic circuit length in core
130 cross-sectional area of core
210 primary winding
220 secondary winding
230 a sub-winding
240 a tap
250 a segment
260 a connection point (in general)
261 end connection point of a winding
262 end connection point of a segment that is not 261
263 connection point of a segment that is not 262
264 connection point of a sub-winding
265 the collection of all the connection points between the primary winding 210 and the switching network 400
266 the collection of all the connection points between the secondary winding 210 and the switching network 400
280 required snubber circuit in the transformer
285 optional snubber for a load
300 input voltage
310 magnetizing current (conventional transformer)
311 magnetizing current (transformer system according to present invention)
320 primary load current
330 total primary current
351 voltage across load (transformer system according to present invention)
352 voltage across load (conventional transformer #1)
353 voltage across load (conventional transformer #2)
370 percentage power efficiency
371 percentage power efficiency (of the example preferred implementation of a transformer system according to present invention)
372 percentage power efficiency (of conventional transformer #1)
373 percentage power efficiency (of conventional transformer #2)
381 power delivered to the load (by the example preferred implementation of a transformer system according to present invention)
382 power delivered to the load (by conventional transformer #1)
383 power delivered to the load (by conventional transformer #2)
390 region of waveform depiction in FIG. 3A or FIG. 3B that is enlarged in FIG. 3C
395 a group of times at which the transformer system's configuration switches during one half-cycle
396 any of the times within the cycle when the configuration of the example implementation switches between primary state 1 (310 turns) and primary state 2 (360 turns)

397 any of the times within the cycle when the configuration of the example implementation switches between primary state 2 (360 turns) and primary state 3 (410 turns)
398 any of the times within the cycle when the configuration of the example implementation switches between primary state 3 (410 turns) and primary state 4 (460 turns)
400 Switching network
402-412 example switch numbers for use in FIG. 6 and FIG. 7
420-425 switches for configuring primary winding of the example preferred implementation in FIG. 8
426-440 switches for configuring secondary winding of the example preferred implementation in FIG. 8
450 an individual SPST switch
451 a superjunction MOSFET
452 a gate driver (integrated circuit)
453 pin 1 of the gate driver
454 the optocoupler input to 452
455 a floating power supply
456 one terminal of a single switch
457 a bus-bar connecting the source terminals of several superjunction MOSFET transistors
458 a bus-bar connecting the gate terminals of several superjunction MOSFET transistors
500 microcontroller and its support equipment
710 input voltage zero-crossing sensor
720 input voltage magnitude sensor
730 output voltage across the load (for each secondary winding)
740 output current through that load (for each secondary winding)
751 magnetic core temperature sensor
752 one or more winding temperature sensor(s)
753 one or more switch temperature sensor(s)
754 ambient temperature sensor
810 startup program
820 time slice generator
830 sensor monitoring program
840 routine event planning program
850 routine event initiator
860 extreme event handler

What is claimed is:

1. A transformer system comprising:
a magnetic core;
one or more windings, wherein each of the one or more windings comprise one or more sub-windings configured with a plurality of connection points;
a switching network connected to the plurality of connection points, wherein the switching network is controllably operative at one or more times during each quarter-cycle of an AC input voltage to select different effective numbers of turns in each winding;
whereby the transformer system transforms the AC input voltage to an AC output voltage which is regulated to a desired AC output voltage.

2. The transformer system as in claim 1 wherein at least one of said one or more windings has one or more taps.

3. The transformer system as in claim 1 wherein at least one of said one or more windings comprises a series connection of segments.

4. The transformer system as in claim 3 wherein at least one of said one or more windings comprises a series-connected set of M segments, wherein each of the segments of the series-connected set of segments each of which comprise N sub-windings, wherein the number of turns per sub-winding in successive members of the series-connected set of M segments is equal to a constant K times successive non-negative integer powers (0, 1, 2, . . . , M−1) of the number N.

5. The transformer system as in claim 1 wherein at least one of the sub-windings also comprises a permanently connected snubber circuit.

6. The transformer system as in claim 1 also comprises a switching controller, wherein the switching controller is operative to select a chosen configuration of an effective number of turns in each of the one or more windings, wherein the switching controller is configurable to modify to the effective number of turns in each of the one or more windings simultaneously.

7. The transformer system as in claim 6 wherein the effective number of turns in each of the one or more windings is modified at least once during each quarter cycle of the AC input voltage, wherein the effective number of turns in each of the one or more windings is modified to a smaller effective number of turns in each of the one or more windings when a load current is above a load current threshold, wherein the effective number of turns in each of the one or more windings is modified to a larger effective number of turns in each of the one or more windings when a magnetizing current is above a magnetizing current threshold.

8. The transformer system as in claim 7 wherein the switching controller selects a chosen configuration at least once within each quarter cycle of the AC input voltage responsive to a sensed current load on at least one secondary winding.

9. The transformer system as in claim 7 in wherein the effective number of turns in each of the one or more windings is selected by the switching controller to make the voltage across the load most closely match the designed output voltage over a range of load values and/or a range of input voltages.

10. A transformer system comprising:
a transformer comprising:
a magnetic core;
a primary winding, wherein the primary winding is coupled to the magnetic core though an opening in the magnetic core, wherein an AC input is applied to the primary winding;
a secondary winding, wherein the secondary winding is coupled to the magnetic core though the opening in the magnetic core;
wherein the transformer is responsive to the AC input voltage applied to the primary winding to induce a magnetizing current in the primary winding,
wherein the magnetizing current exhibits a maximum current at times during each cycle of the AC input voltage, wherein the magnetizing current exhibits a load current maximum;
a switching network connected to the primary windings and the secondary windings of the transformer;
wherein the switching network is operative during each cycle of the input AC input voltage to reduce the effective numbers of turns in the primary windings and the secondary windings synchronously when the load current in the secondary windings is above a defined maximum load current threshold, and the magnetizing current in the primary windings is below a minimum magnetizing current threshold,
wherein the switching network is operative during each cycle of the input AC input voltage to increase the effective number of turns in the primary windings and the secondary windings synchronously when the load current in secondary windings is below a defined minimum load current threshold low and the magnetizing current in said primary windings is above a maximum magnetizing current threshold.

11. The transformer system as in claim 10 wherein the primary windings comprise one or more primary segments, wherein the secondary windings comprise one or more secondary segments, wherein the one or more primary segments comprise a plurality of primary sub-windings, wherein the one or more secondary segments comprise a plurality of secondary sub-windings, wherein the switching network is operative to connect said primary and secondary sub-windings within each of the segments in series, in parallel, or in a series-parallel arrangement.

12. The transformer system as in claim 10 wherein the controller switching network is operative to reduce the effective number of turns in the primary windings and secondary windings synchronously when the primary load current is above a primary load maximum threshold and wherein the controller switching network is operative to increase the effective number of turns in the primary windings and secondary windings synchronously when the primary magnetizing current is above a primary magnetizing maximum during each quarter cycle of the AC input voltage.

13. A transformer system as in claim 10 wherein said network is operative to reduce the numbers of turns in both said primary and secondary windings when the current in said load is large and increase the numbers of turns in both said primary and secondary windings when said load current is low and said magnetizing current is high.

14. A transformer system as in claim 12 wherein the primary windings and the secondary windings are bifilar.

15. A method for regulating the output of a transformer comprising:
- controlling a switching network to interconnect a plurality of primary connection points on a primary winding to produce a primary winding configuration and simultaneously interconnect a plurality of secondary connection points on each secondary winding to produce a secondary winding configuration for each secondary winding;
- controlling a switching network which interconnects a plurality of primary connection points and a plurality of secondary connection points, wherein the plurality of primary connection points are configured to connect one or more primary windings of a transformer to an AC input voltage, and the plurality of secondary connection points are configured to connect one or more secondary windings of the transformer to a load, wherein a switching controller is operative to switch the plurality of primary connection points and the plurality of secondary connection points;
- whereby the switching controller regulates the output voltage of the transformer by optimized switching of the switching network at one or more times during each quarter-cycle of an AC input voltage to select an effective number of one or more primary winding turns and to select an effective number of one or more secondary winding turns.

* * * * *